(12) United States Patent
Rai et al.

(10) Patent No.: US 6,438,110 B1
(45) Date of Patent: Aug. 20, 2002

(54) RESERVATION OF CONNECTIONS IN A COMMUNICATIONS NETWORK

(75) Inventors: Suman Rai, Hallingbury; Dennis Stewart William Tansley, Braintree, both of (GB)

(73) Assignee: Nortel Networks Limited, Bampton (CA)

(*) Notice: Subject to any disclaimer, the term of this patent is extended or adjusted under 35 U.S.C. 154(b) by 0 days.

(21) Appl. No.: 09/383,761

(22) Filed: Aug. 26, 1999

Related U.S. Application Data

(63) Continuation of application No. 08/968,639, filed on Nov. 12, 1997, now abandoned.

(51) Int. Cl.[7] .................................................. H04M 7/00
(52) U.S. Cl. ........................ 370/254; 370/390; 370/400; 370/410
(58) Field of Search ................................ 370/351, 368, 370/374, 229, 230, 237, 233, 431, 437, 468, 358, 363, 377, 404; 709/228, 100, 102, 204, 226, 225

(56) References Cited

U.S. PATENT DOCUMENTS

| | | | | | |
|---|---|---|---|---|---|
| 5,065,392 A | * | 11/1991 | Sibbitt | ......................... | 370/360 |
| 5,347,511 A | * | 9/1994 | Gun | ......................... | 370/255 |
| 5,483,631 A | * | 1/1996 | Nagai | ......................... | 345/329 |
| 5,596,572 A | * | 1/1997 | Wille-Fier | ................... | 370/360 |
| 5,644,715 A | * | 7/1997 | Baugher | ..................... | 708/228 |
| 5,751,965 A | * | 5/1998 | Mayo | ......................... | 709/224 |
| 5,768,552 A | * | 6/1998 | Jacoby | ....................... | 709/224 |
| 5,781,537 A | * | 7/1998 | Ramaswami | ................ | 370/410 |
| 5,923,874 A | * | 7/1999 | Koenig | ....................... | 709/100 |
| 5,951,637 A | * | 9/1999 | Kuzma | ....................... | 370/260 |
| 5,978,363 A | * | 11/1999 | Dimitrijevic | ................ | 370/319 |

* cited by examiner

*Primary Examiner*—David Vincent
*Assistant Examiner*—Ricardo M. Pizarro
(74) *Attorney, Agent, or Firm*—Harness, Dickey & Pierce, P.L.C.

(57) ABSTRACT

A process and apparatus for scheduling reservations across a communications networks receives a plurality of connection requests specifying a time for the connection, and attempts to find a route for the connection. If an available route is found, the connection is reserved in advance. Unscheduled connection requests are stored in the list, which is generated as a display view at a graphical user interface. Similarly, reserved connections are stored in another list which forms a basis for a display view of reserved connections. The list of reserved connections is used by a network controller to implement the reserved connections at the appropriate times.

51 Claims, 17 Drawing Sheets

Fig. 16

RESERVATION OF CONNECTIONS IN A COMMUNICATIONS NETWORK

This is a continuation of U.S. patent application Ser. No. 08/968,639, filed Nov. 12, 1997 now abandoned.

FIELD OF THE INVENTION

The present invention relates to allocation of resources in a communications network and more particularly to scheduling reservations for connections across a communications network.

BACKGROUND OF THE INVENTION

A conventional communications network comprises a plurality of nodes, at which are provided node equipment, the nodes connected by a plurality of communications links, the links comprising link equipment. The node equipment may comprise, for example a personal computer or a telecommunications switch apparatus, and the links may comprise, for example a coaxial cable linking computers, or a terrestrial or atmospheric telecommunications link, such as an optical fiber link, microwave link or the like.

Such types of traffic carried by a network, such as that resulting from data communication is often of a bursty nature which means that short "bursts" of high communication activity occur between longer periods of low or no network traffic. This kind of traffic leads to the network-being especially prone to overloading of link equipment. Further, at certain times of the day there is more likely to be a high volume of network traffic than at other times. For example, a "busy hour" occurs around 11.00 am of each weekday morning, and at around 2.00–3.00 pm each week day.

Conventional telecommunications networks operate by making connections between subscribers. A connection is a communications path between a source node and one or more destination nodes via a route across one or more network links. Certain usages of communications networks such as the carrying of voice conferencing communication traffic data or distance learning traffic data heavily utilize bitrate across a connection and can require point to multi-point or multipoint to multipoint connections. These types of usage can use a large proportion of the bitrate capacity of the links used by a connection. If traffic of one connection attempts to use the same link as traffic of another connection at the same time, this can result in individual link equipment being saturated leading to congestion on the network. In applications which are particularly sensitive to maintaining quality of service, for example the transfer of computer data, overloading of links leads to corruption of the data. For example, in an asynchronous transfer mode (ATM) communications network, overloading of node and link equipment produces loss of ATM cells of data. ATM cells are buffered at node equipment prior to transmitting over links. Where congestion occurs, buffers overfill and ATM cells are overwritten by newly arrived incoming cells. Traffic data contained in the overwritten cells is lost.

In particular, with the advent and increased availability of ATM communications systems, there is provided large amounts of bitrate which are available across a communications network. ATM systems are becoming increasingly available in access networks and are particularly suited to point to multipoint and multipoint to multipoint service types.

One object of the present invention is to schedule services across a communications network, where a nature of the service, eg such as its bitrate, data type and projected time of commencement are known in advance.

Another object of the present invention is to ensure that the network links have the necessary bitrate capacities to cope with transferring data without corrupting it.

SUMMARY OF THE INVENTION

According to a first aspect of the present invention there is provided a process for reserving a plurality of connections in a communications network, said process comprising the machine executable steps of:

inputting a plurality of connection requests describing a plurality of required connections, each said connection request specifying a predetermined time for said connection; and reserving a plurality of connections across said communications network in response to said plurality of connection requests.

Preferably said step of reserving connections comprises, for each required connection;

searching for an available route for said connection; and where an available route is found for said connection, reserving said route in advance of said predetermined time.

A schedule of connections with associated routes may comprise for example a schedule for a 24 hour day divided into one second intervals. The schedule of connections may be tailored to time intervals chosen to suit a required horizon or granularity suited to operation timescales and constraints.

Said reservations algorithm may be applied to all or some of said connection requests an indefinite number of times.

Preferably a said connection request specifies a required bitrate and said step of searching comprising searching for one or more routes having an available capacity capable of supporting said required bitrate.

Preferably the process comprises the step of, for each required connection, allocating capacity of a corresponding reserved route to said connection.

Said predetermined time may comprise a start time.

Preferably said process comprises the step of searching for a valid route for each requested connection from a list of all possible routes across said network.

Said process may comprise the step of constraining a search of all possible routes within operator defined constraint parameters.

Said process may comprise the step of searching for an available route by creating a list of a plurality of routes between a plurality of corresponding respective source nodes and destination nodes of said plurality of requested connections.

Said connection requests may be stored as a list of connection requests awaiting available routes.

The process may further comprise the step of storing a list of connection requests for which routes have been reserved.

The process may further comprise the step of displaying a list of connection requests which are awaiting available routes.

The process may further comprise the step of displaying a list of connection requests for which routes have been reserved.

Preferably the process comprises the step of displaying a plurality of display views of said reserved connections.

Said process may comprise the step of generating a network view showing node elements and link elements as a plurality of corresponding icons and visually displaying a route taken by a reserved connection on said network view.

Said process may further comprise the step of displaying a list of reserved connections, and for each said displayed reserved connection displaying a start time of the reserved connection. The process may comprise the step of displaying an end time of the reserved connection.

Said process may further comprise the step of displaying data describing parameters of a reserved connection, wherein said parameters are selected from the set a traffic type; a link data capacity; a route data capacity; a peak bitrate; an average bitrate; an estimated cell loss; a priority rating of a said connection.

Said process may further comprise the step of generating a display view of a said reserved connection, said view comprising a bar chart display displaying data representing a plurality of links on a first axis, and displaying data representing time on a second axis; wherein said data representing a plurality of said links comprises data representing utilization of said links.

Said process may further comprise the step of generating a display view displaying data describing a plurality of services carried on said reserved connections.

According to a second aspect of the present invention there is provided a network management apparatus for managing a communications network comprising a plurality of node elements and a plurality of link elements, wherein data communication services are carried over a plurality of end to end connections over said nodes and links, said apparatus comprising:

interface means for inputting a plurality of requests for connections across said network; and means for reserving a plurality of connections across said communications network in response to said plurality of connection requests.

Preferably the network management apparatus further comprises:

display means for displaying a plurality of said reserved connections, wherein said display means supports a plurality of display views of said reserved connections.

The network management apparatus may comprise display means supporting a plurality of display views, wherein a said view comprises a network view showing node elements and link elements as a plurality of corresponding icons; and means for visually displaying a route taken by a said reserved connection on said network view.

The network management apparatus may further comprise display means supporting a plurality of display views, wherein a said view comprises a list of reserved connections, and for each said displayed reserved connection; a display of start time of the reserved connection. The display means may display an end time of the reserved connection.

The network management apparatus may comprise display means for displaying a plurality of display views of reserved connections, wherein for each said displayed reserved connection there is displayed data describing parameters of said reserved connection wherein said parameters are selected from the set a traffic type; a link data capacity; a route data capacity; a peak bitrate; an average bitrate; an estimated cell loss; a priority rating of a said connection.

The network management apparatus may comprise display means supporting a plurality of display views, wherein a said view comprises a bar chart display displaying data representing a plurality of links on a first axis, and displaying data representing time on a second axis; wherein said data representing a plurality of said links comprises data representing utilization of said links.

The network management apparatus may comprise display means supporting a display view, wherein data describing utilization is color coded according to an amount of said utilization.

The network management may comprise display means supporting a plurality of display views, wherein a said display view comprises:

a display of data describing a plurality of services arranged along a first axis, and data describing time on a second axis;

wherein said display of said data describing said services comprises a plurality of icons representing available time slots specified in a plurality of connection requests; and a plurality of icons representing time durations of reserved connections.

The network management apparatus may comprise display means supporting a plurality of display views, in which an available time slot icon comprises:

an icon representing a start time; and an icon representing an end time.

The invention includes a network controller adapted to operate the process according to the first aspect.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which:

FIG. 16 illustrates a graphical interface display service manager window display, showing a list of connections/connection requests;

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without using these specific details. In other instances, well known methods and structures have not been described in detail so as not to unnecessarily obscure the present invention.

Figure 1:
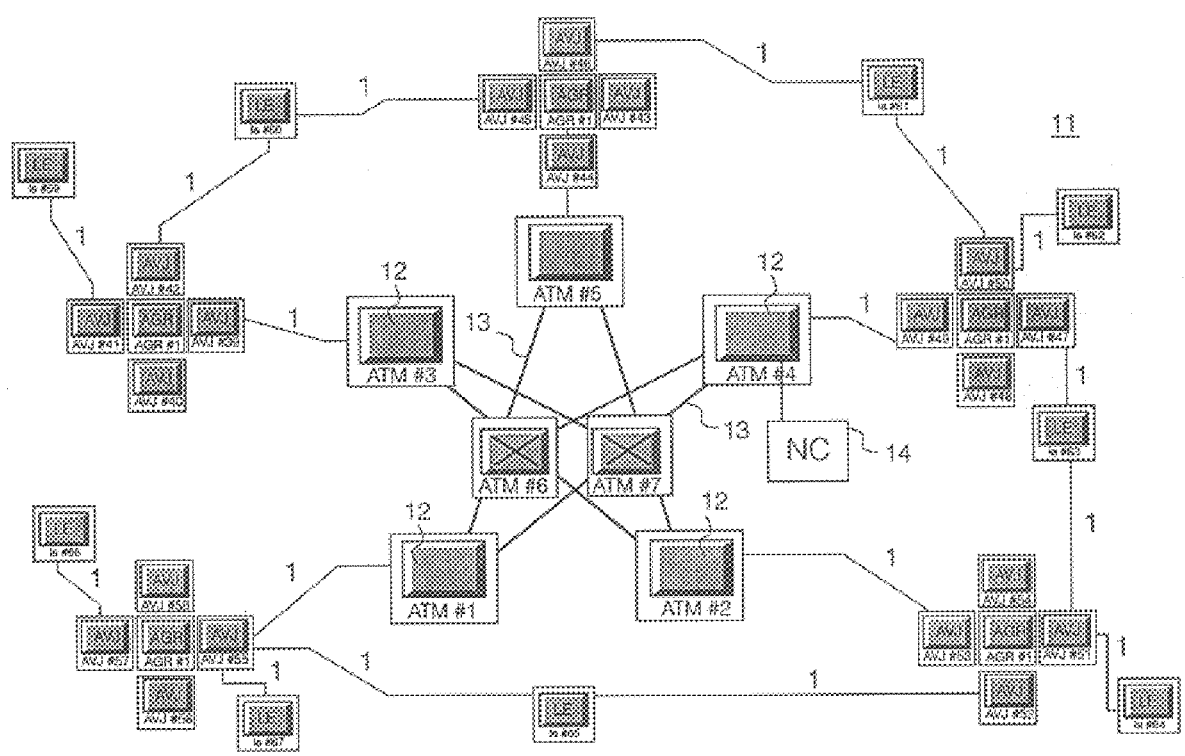
FIG. 1 illustrates schematically an overview of a communications network, comprising a plurality of nodes and links.

Referring to FIG. 1 herein a communications network 11 comprises a plurality of node elements 12 each comprising an item of node equipment for example a switch, and a plurality of link elements 13, connecting the node elements, each link element 13 comprising an item of link equipment. Each item of node or link equipment comprises one or a plurality of physical components. In general, each item of node or link equipment supports a plurality of communications channels. Communications traffic data signals are transmitted along the link equipment and through the node equipment over a plurality of connections.

The communications network 11 may comprise a computer network, for example a plurality of personal computers, workstations or the like as the node elements 12 connected by a local area network, comprising a link element. The link elements may comprise a wide area network, broadband network, eg ATM or SDH or the like. The node equipment 12 may comprise a plurality of switch apparatus, as the node equipment 12, and a plurality of terrestrial, atmospheric, or satellite communications links my comprise link equipment linking the node equipment. The communications network may include mobile phone communications apparatus, resident at one or more nodes of the network. A node element may comprise a gateway to another network, for example a world-wide web gateway. In general, the communications network will comprise a variety of different types of node equipment, and a variety of different types of link equipment made by different manufacturers and having differing performance specifications.

Attached to one or more nodes is a network controller 14 which performs network management functions (such as routing connections). The network controller performs a connections scheduling process described in this document.

In the following description of a best mode for carrying out the invention, reference will be made to an asynchronous transfer mode (ATM) network, however the invention is not restricted for operation in an ATM environment, and in general the invention may find applicability in any connection oriented communications system and over a range of transport protocols of which ATM is just one example. In particular, the invention may find applicability in a synchronous digital hierarchy (SDH) environment.

Figure 2:
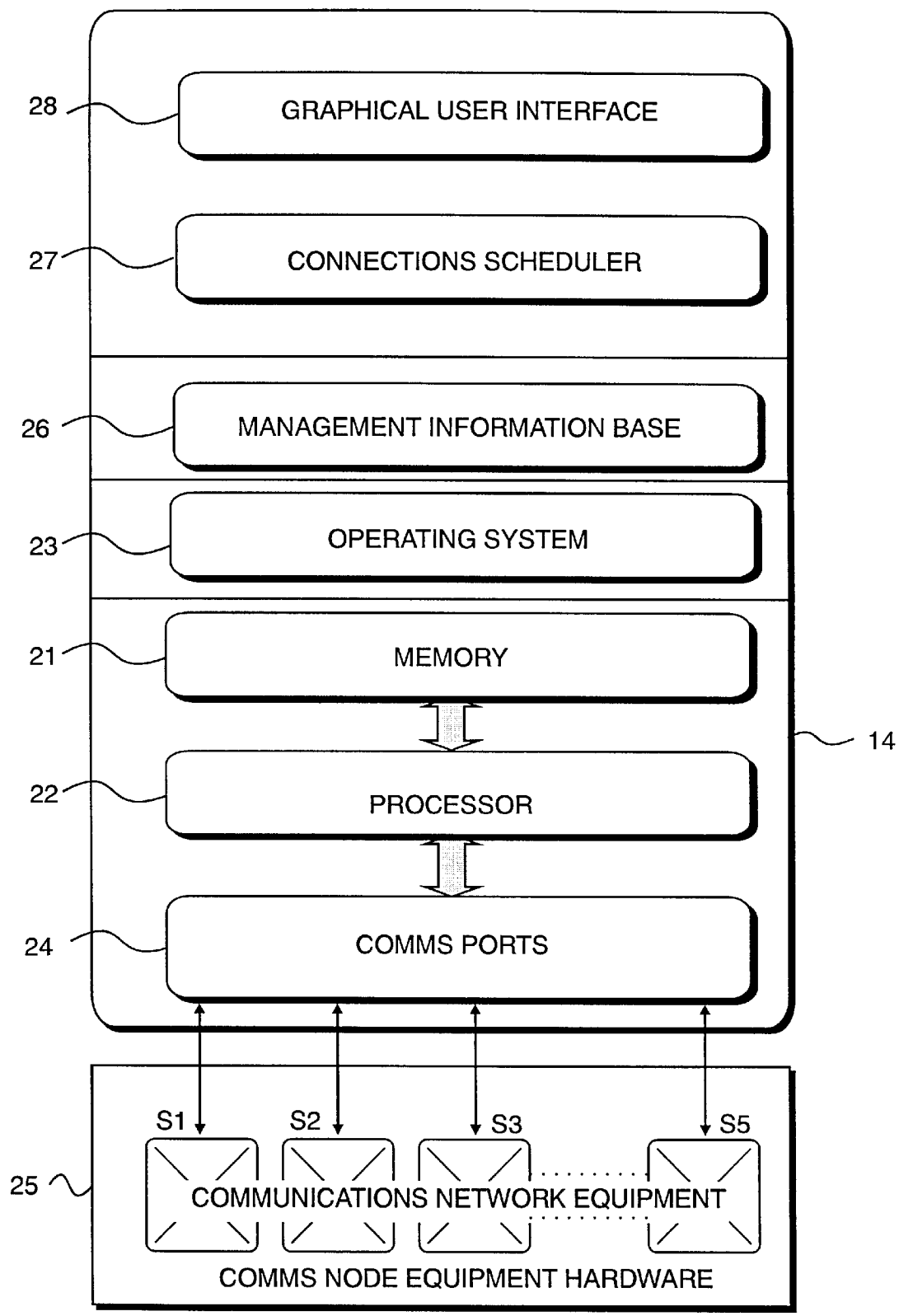
FIG. 2 illustrates components of a network controller incorporating a specific embodiment of the present invention.

Referring to FIG. 2 of the accompanying drawings there is shown a schematic diagram of network controller 14. Network controller 14 comprises a general purpose computer, such as a Hewlett Packard 9000 series workstation, comprising a memory 21; a processor 22; an operating system 23; a plurality of communications ports 24 through which data is transferred to and from communications node equipment hardware 25; a management information base (MIB) 26 holding data describing physical resources of a network, eg routes, node equipment, link bitrates; a connections scheduler 27 operating to schedule connections across the network, and a graphical user interface 28 comprising a visual display unit, a pointing device, eg mouse or track ball and one or more data entry devices, the graphical user interface enabling an operator to enter requests for connections into the connections scheduler, and to obtain visual and hard copy data describing scheduled connections or pending requests for connections. Requests for connections may be entered automatically by file transfer. In a further modification, the network controller may be provided with means, eg an application, for automatically requesting connections.

Specific implementations according to the present invention herein address the problem of network congestion by taking advantage of prior knowledge of services which result in a high level of network traffic, where the approximate time and duration of the services are known beforehand, for example distance learning or teleconferencing services. Herein, there is presented a method of allocating reservations for network connections in advance in an attempt to ensure that the amount of traffic on a particular route of links between source and destination nodes will not exceed a maximum bitrate capacity of each link in that route at any time during the connection.

In order to allocate connections in advance, data describing a list of connection requests specifying start time and duration or end time, as well as information describing the source and destination of each requested connection is required. Data describing network links' bitrate capacities is also required. It is possible to specify a range of values for a start time, an end time and a duration of a connection request rather than give a definite value for each. This allows a degree of flexibility in allocating reservations for connections. For example an application for which the timing of its connection is not of great importance can be accommodated within a relatively large time and duration range, which allows applications with more specific time and duration ranges for their connections to be allocated closer to their required times.

A connections schedule may comprise data describing a list of "time slots" wherein each time slot is associated with data describing a particular route or routes. In order to achieve an allocation of valid routes to requested connections, it is necessary to allocate a route to each requested connection which will conform to the constraints imposed by the maximum capacity of each link in the route.

Obtaining an allocation of valid routes involves:

i) choosing a route of links with enough capacity for a connection;

ii) allocating capacity/resources to connections from links as defined in a chosen route for each connection;

iii) scheduling of each connection on a chosen route, such that the links within the network are able to cater for the connections at the requested times and durations of each connection.

The allocation problem is further complicated in that a route for a connection must be chosen while taking into account bitrate capacity constraints of the links in each route. The bitrate capacity constraints vary during and as a result of bitrate capacity allocation. However, capacity allocation can only be done once a route has been chosen. Likewise, allocation of connections is dependent on capacity constraints at a requested time. Considering that a network may have a large number of source and destination nodes, and between each source and destination node there are a multiplicity of possible routes, each comprising a plurality of links and nodes, and that each link has a bitrate availability which is variable with time of day, making an allocation of reservations in an optimized manner is a computationally difficult task.

In a specific implementation of the present invention presented herein, a method of creating a schedule of connections is to search for a valid route for each requested connection from a list of all possible routes via links between the appropriate source and destination nodes of each requested connection. Such a search can be very complex for a network comprising a large number of links and nodes and so it is desirable to have available a variety of scheduling strategies which can be used in an attempt to ensure that the maximum possible number of connection requests are allocated valid routes. Again, the problem is further complicated due to the capacity constraints of the links varying during and as a result of capacity allocations.

Figure 3:
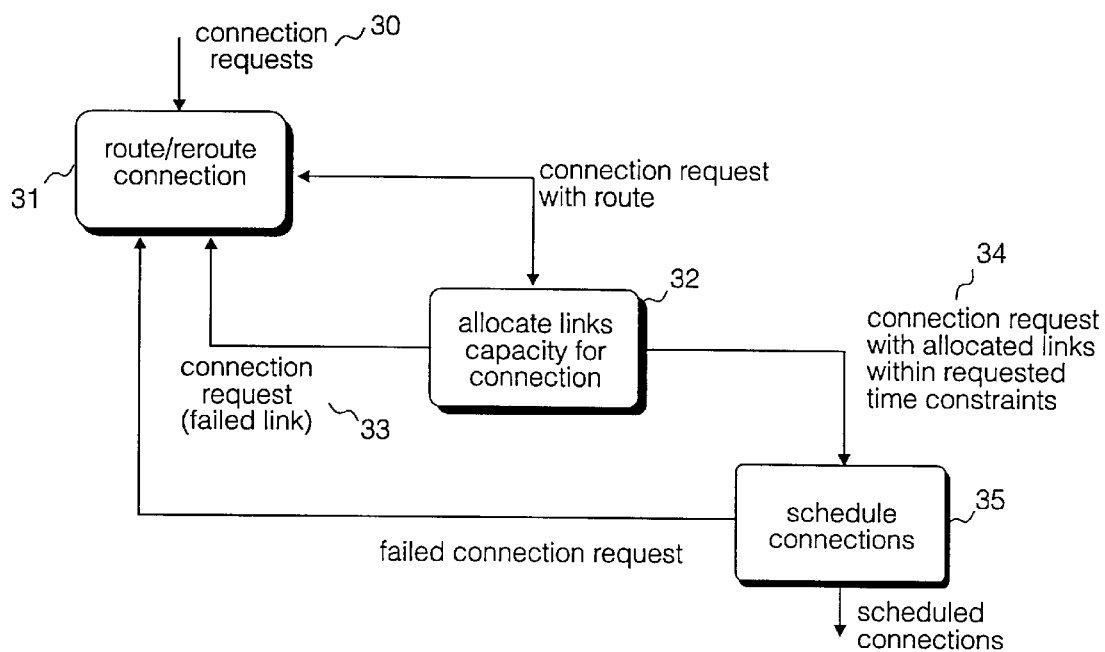
FIG. 3 illustrates in overview a process operated by a network controller according to a specific method of the present invention.

FIG. 3 of the accompanying drawings illustrates an overview of data processing operations of a connection scheduling process operated by connections scheduler 27, in context with other functions carried out by other elements of the network controller 27, eg a routing function 31 carried out by a router element. The network controller receives a list of connection requests 30 in the form of connection request data, each connection request specifying a source and one or more destinations. The router attempts to create a list of one or more routes of network links between each connection requests' source node and destination node(s) by processing the connection request data in accordance with a routing algorithm—step 31. One or more possible routes are allocated to each connection request. The connection scheduling process is implemented as operations on data signals describing connections, connection requests, routes and bitrates of links in steps 32 to 35. For each connection request allocated bitrate capacities of the links which are used by a route allocated to that connection request are decreased by an amount of bitrate capacity required by the connection request calculated according to the service type (step 32) so that once a bitrate of a particular link has been allocated to a particular connection request, for a particular period, that same bitrate is not also allocated elsewhere to another connection request. If one or more links in a particular route do not have the required bitrate capacity available to support the requested connection, the connections scheduler attempts to use another of the routes available to that connection request—step 33, until an available route is found which has sufficient bitrate capacity on all links to carry the service across the requested connection. Once valid routes have been allocated to all connection requests, or to as many connection requests as valid routes can be assigned, the connection scheduling algorithm adjusts the allocated times and durations of the connections according to the link bitrate capacity available on each route—step 34—this procedure is described in detail later. Data describing each connection request with data describing its associated allocated route of links (if a valid route was found) and allocated start and end times is entered into a schedule of allocated connections (step 35). The network controller 14 uses the schedule of allocated connections created to implement the allocated connections at the scheduled times.

The particular embodiment of the invention described hereinafter is one in which the connections scheduler 27 is implemented by configuring the network controller as a knowledge base system.

Figure 4:
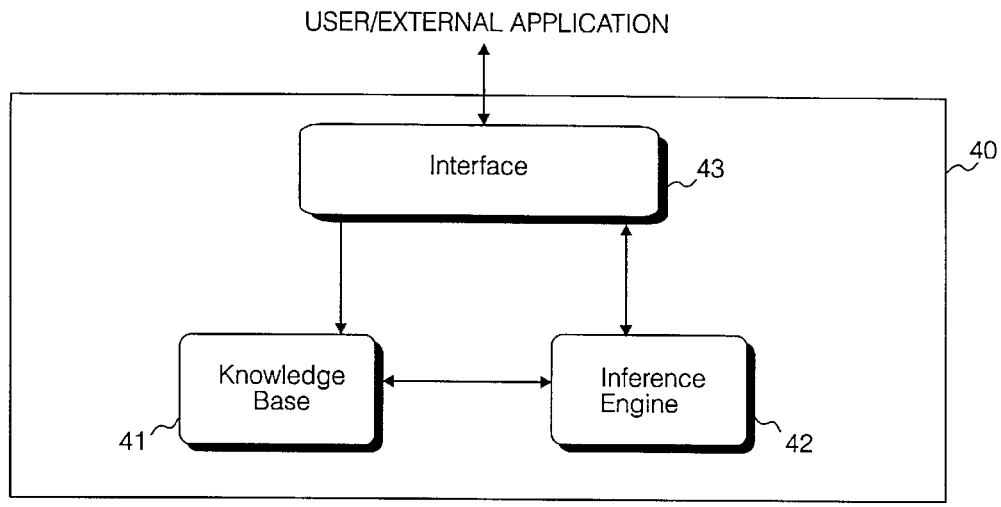
FIG. 4 illustrates components of a connections scheduler comprising the network controller.

FIG. 4 of the accompanying drawings illustrates a schematic diagram of the knowledge base system 40. The knowledge base system is implemented in a programming environment supporting features such as constraint handling and specifiable searching techniques which aid coding of the knowledge base system. It will be appreciated by those skilled in the art that the knowledge base system could also be implemented using one of a number of other high level programming languages, for example C++, C or Fortran, although constraints based techniques are better implemented using logic programming languages such as Prolog.

The programming environment used in the particular embodiment of the present invention described below is Ilog Solver/Schedule, which is an object-oriented knowledge base system based on the C++ programming language. Its C++ compatibility means that it should be compilable on most hardware platforms. For constructing the knowledge base system in Ilog Solver/Schedule, first the problem of how to create a scheduling process is formulated, and then represented in object oriented format, in this case in the form of C++ classes. Then, procedures and algorithms which actually perform searches are written, and optimization criteria data and constraint data for scheduling are written. The search algorithm performs according to the optimization criteria with which it is written, and within the constraint data with which it is written.

Knowledge Base System Overview

In general, a prior art knowledge base system (KBS) is an expert system, which contains information on a particular subject area and uses this "knowledge" to find a solution to a query defined as a set of facts and a goal relating to the information stored. Prior art constraint satisfaction paradigms have evolved from a combination of artificial intelligence and operations research techniques.

In the embodiment according to the present invention herein, the Ilog Solver/Schedule knowledge base system 40 comprises a knowledge base 41, an inference engine 42 and an interface 43.

The knowledge base 41 comprises a database which stores a schedule of data describing received connection requests, routes assigned to those connection requests by the router, ranges of start times which are acceptable for each connection request, requested durations of connections, ranges of end times of connections which are acceptable for each connection request, and data describing information on the node equipment, and link equipment, in particular data describing available bitrates of links, and of virtual paths and virtual circuits in the communications network. This data can be stored in the form of antecedent-consequence rules or, in the case of an Ilog Solver/Schedule implementation, as objects.

The inference engine 42 comprises an algorithm or a set of algorithms which is applied to and updates the data in the knowledge base 41 in order to find solution(s) to a given query. Several widely-used known inference engine algorithms may be used in the specific implementation herein, including forward or backward chaining algorithms with breadth or depth first search. Some known knowledge base systems, such as Hog Solver/Schedule, allow complex user-defined algorithms and constraints to be written. Several inference engine algorithms are available within the Ilog Solver/Schedule product, and in the best mode herein are selected according to the criteria and constraints to be applied.

The interface 43 links the knowledge base 41 and inference engine 42 with users, eg a network operator operating graphical user interface 28, or external applications such as router 31. The interface may be divided into a user interface for querying the knowledge base and a developer interface for creating the knowledge base. Data found by the inference engine are returned to the user or external applications, and knowledge base information and queries are entered to the knowledge base from the user or external application, via the interface.

Connections Scheduling Process Operation

Figure 5:
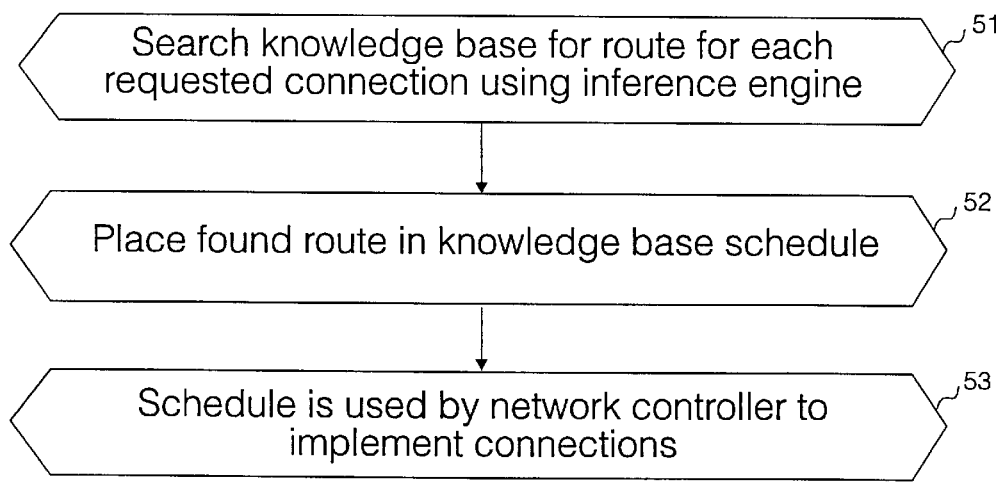
FIG. 5 illustrates an overview of an operation of the connections scheduler of FIG. 4.

FIG. 5 of the accompanying drawings illustrates an overview of operation of a connections scheduling process carried out by connections scheduler 27. An inference engine algorithm is applied to the data of the knowledge base (step 51). The inference engine algorithm attempts to find a valid route of links for each connection request according to a predetermined criteria, eg least hops. If a valid route is found it is entered into a schedule comprising the knowledge base 41 (step 52). This schedule is used by the network controller to implement the connections (step 53).

Components of the knowledge base system 40 representing the specific embodiment of the present invention will now be described.

Schedule Knowledge Base

Figure 6:
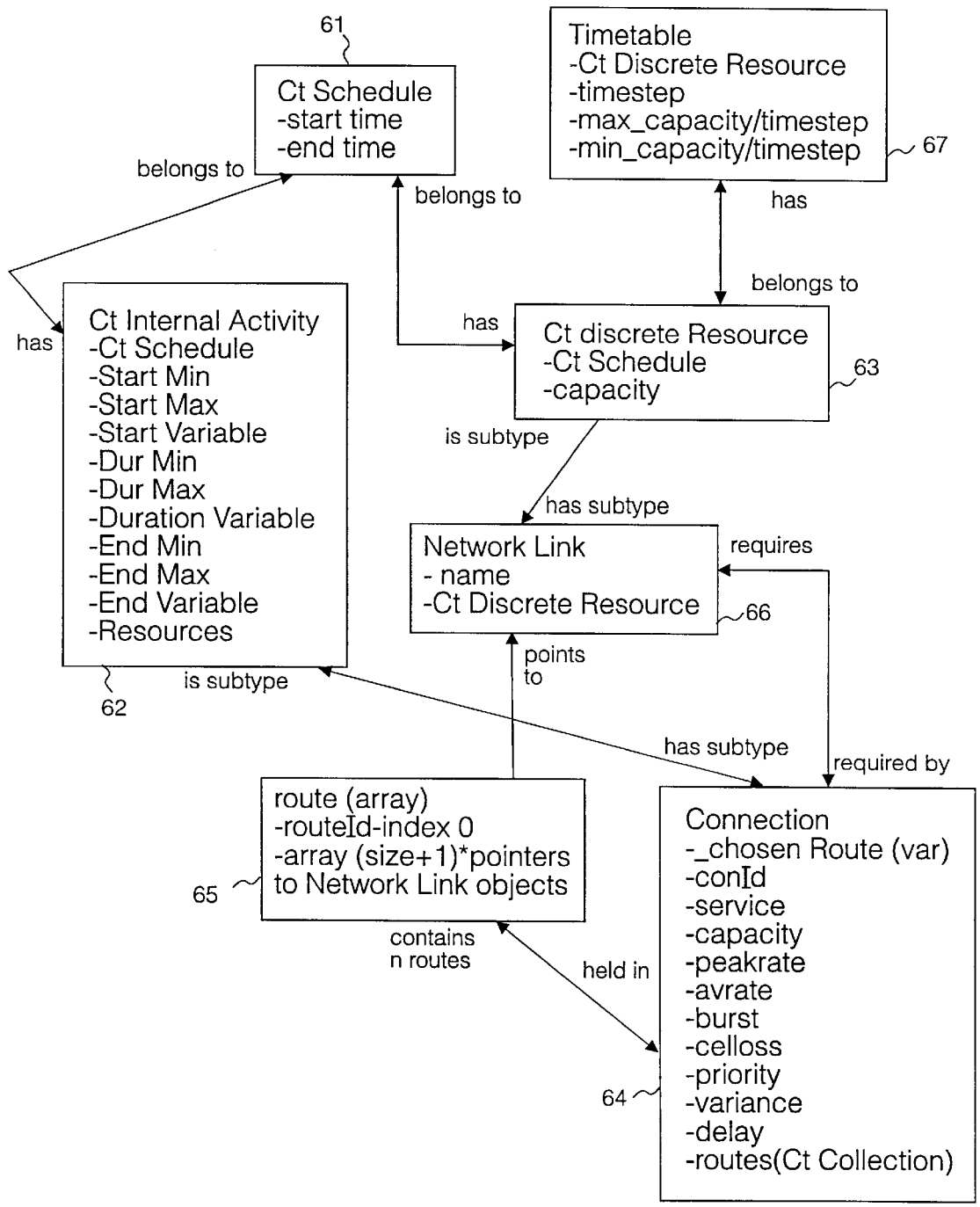
FIG. 6 illustrates an object class design of a knowledge base of the connections scheduler.
Figure 7:
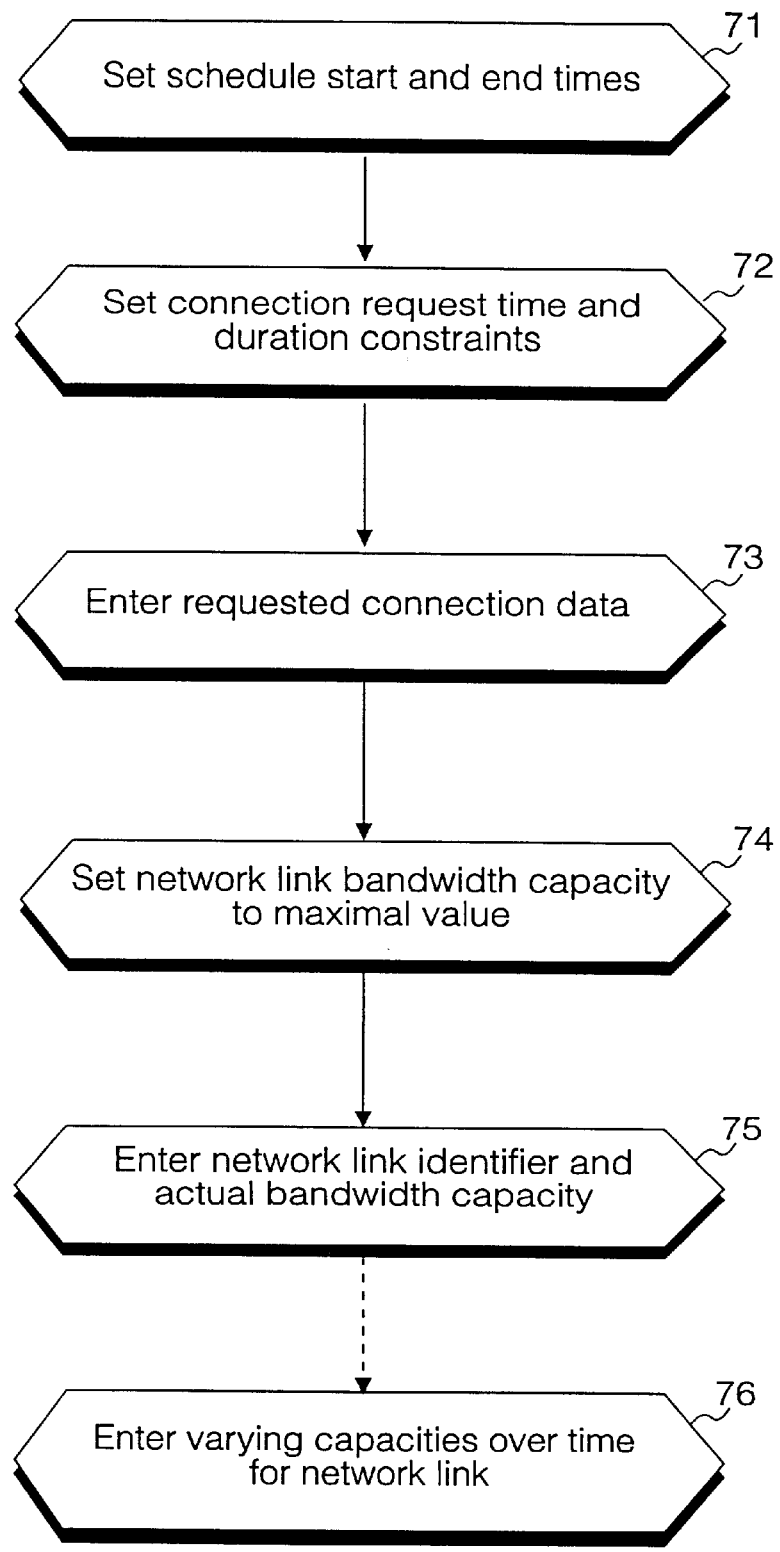
FIG. 7 illustrates parameters which are entered, in order of precedence.
Figure 8:
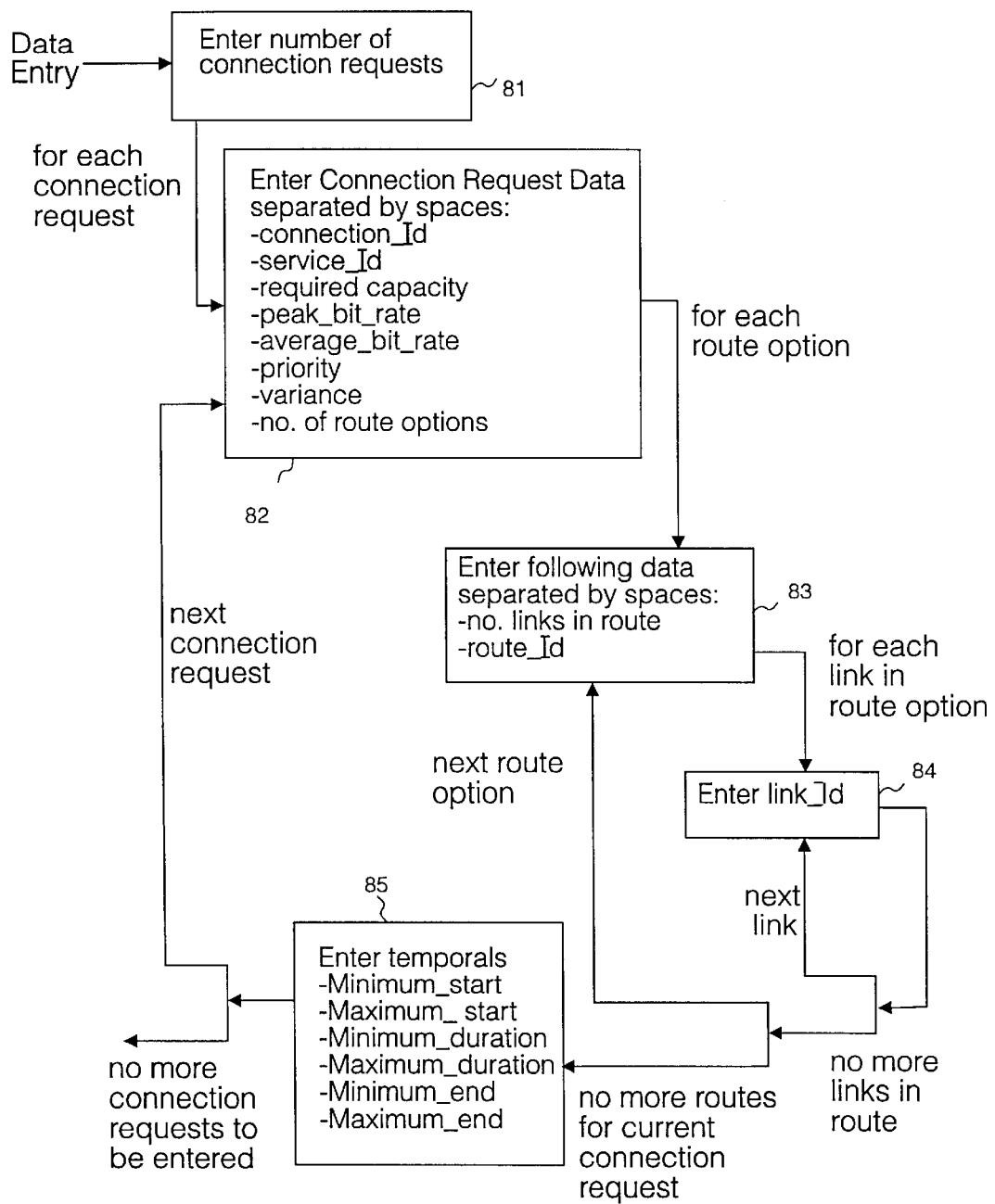
FIG. 8 illustrates a data entry procedure for entering connection requests into the connections scheduler.

Referring to FIGS. 6 to 8 herein, there will now be described construction and operation of a schedule comprising the knowledge base 41 of FIG. 4 herein. FIG. 6 illustrates an object class design of the knowledge base. A schedule object referred to as CtSchedule object shown as 61 in FIG. 6 is created, with an initially unlimited number of timeslots.

The schedule object CtSchedule comprises a special Ilog Solver/schedule library class which supports search and constraint handling techniques. Schedule object CtSchedule has two special Ilog Solver/Schedule library subclasses: first and second sub classes CtIntervalActivity 62 and CtDiscreteResourse 63 respectively, both of which inherit all CtSchedule's private and public attributes, variables and functions.

First sub class CtIntervalActivity 62 is used to represent a communication activity associated with a timeslot of CtSchedule and can use the following format:

CtIntervalActivity [StartMin..StartMax-- DurMin..DurMax-->EndMin..EndMax]
where first entry pair (StartMin and StartMax) relates to start time domain of the communication activity ranging between minimum start and maximum start values. Second entry (DurMin and DurMax pair) relates to duration domain of the communication activity ranging between minimum duration and maximum duration values. Third entry pair (EndMin and EndMax) relates to end time domain of the communication activity, ranging between minimum end and maximum end values.

Second sub class 63 CtIntervalActivity has a sub-type 64 Connection which inherits all CtIntervalActivity private and public attributes, variables and functions of second sub class 63.

A Connection object 64 contains values describing an actual network connection or connection request. As well as the time and duration of a connection, a Connection object comprises:

a character variable identifying the connection (conId);

an integer variable representing the bitrate capacity required of each link used by the connection (capacity); and routes (65 in FIG. 6)—an array of routes defined using an Ilog Solver/Schedule library class CtCollection, each route comprising an array of links of NetworkLink objects 66. Each route has a route identifier (routeId) stored as first element in the array and pointers to NetworkLink objects for each link in the route in the remaining array elements.

A Boolean variable schedule denotes that Connection object is a connection request to be scheduled ("true" by default).

A Boolean variable schedule denotes that Connection object is a scheduled connection ("false" by default).

Other object variables are as follows:

chosenStartTime: the scheduled start time of the connection.

chosenEndTime: the scheduled end time of the connection.

chosenRoute: A variable containing routeId value of route for the connection scheduled by the connection scheduling process.

Further data describing a connection request may be included in Connection, such as priority information.

A NetworkLink object has a name variable to identify itself and is a sub-type of the CtDiscreteResource Ilog Solver/Schedule Library class and therefore inherits all its private and public attributes, variables and functions. CtDiscreteResource contains a capacity variable which represents the maximum theoretical capacity for a resource, in the case of the present embodiment the bitrate capacity of a link. In addition, a sub-class Timetable 67 may be associated with a CtDiscreteResource object. This enables the maximum capacity of a network link in practice to vary over time.

Referring to FIG. 7 herein, there is illustrated entry of constraint parameters to the knowledge base in order of preference. In step 71 there is set the start time of CtSchedule to 0 and end time to 86400, eg corresponding to the number of seconds in a 24 hour day. In a further development of the best mode herein, a schedule of connections may be rolled forward in real time such that at any time connections over a forward moving look ahead period may be scheduled. A time period granularity need not be set on a per second basis, but may be varied by a user.

In step 73 the time and duration of the connection object is set to default values: StartMin, DurMin and EndMin becoming 0 and StartMax, DurMax and EndMax becoming 86400:

CtInterval activity [0..86400-0 . . . 86400-->0 . . . 86400]

Actual data for connection requests can be entered into the knowledge base—step 74. This may be done manually by the user or downloaded from a previously created knowledge base.

Referring to FIG. 8 of the accompanying drawings there is illustrated a data input operation of the connections scheduler 27 in which data characterizing each of a plurality of requested connections is input. The data may be entered manually by an operator typing a keypad of the graphical user interface 28, or may be entered automatically, received over the network from a plurality of subscriber equipment, eg at source nodes.

Data describing each connection request is entered. Such a connection request may represent a request for a point to point service. Where a point to multipoint service or a multipoint to multipoint service is required, such services may be broken down into a number of individual discrete connection requests and each entered individually into the connections scheduler.

Firstly, a numerical value representing a number of connection requests to be entered is input in step 81. Data describing each connection request can then be entered into the knowledge base—step 82. For each connection request a character variable is entered as an identifier for the connection (conId), followed by a space followed by an integer value for the bitrate capacity required by the connection request (capacity in Connection object) along with data describing a peak bitrate required during the requested connection and an average bitrate required during the requested connection. A numerical value data corresponding to the number of possible routes of links between a source and a destination of the requested connection is then input. The numerical value is produced by the router. Further data describing the requested connection is also input, including data describing a service type to be carried on the connection, a variance of the connection, a number of route options to apply to the connection, and priority values ie a value which assigns an importance of scheduling the connection, relative to other connections. Data describing the priority of the connection may be provided by a subscriber, or may be determined from a data describing a service contract, stored in the management information base 26. In step 83, for each possible route of links a numerical value representing the number of links in the possible route is entered followed by a space and then a route identifier. In step 84, for each link in the possible route, a link identifier is entered (name). This link identifier is identical to the name of a network link object representing the appropriate network link (entered into the knowledge base as described below). This is repeated until there are no more links in the route. The route data entered as described is used to create a routes array in the Connection object. If there are further possible routes to be entered the route data entry procedure comprising steps 83, 84 is repeated until no more routes for the current connection request are required. The time and duration of the connection request is entered next in step 85. Temporal constraints on a connection request may include a minimum start time, a maximum start time, a minimum connection duration, a maximum connection duration, a minimum end time, and a maximum end time. This involves entering values for the following variables:

StartMin, StartMax, DurMin, DurMax, EndMin and EndMax.

It is possible to omit entry of one of the StartMin, DurMin or EndMin data values, the omitted value being calculated using the expression: EndMin=StartMin+DurMin. The same also holds for the maximum values.

The connection request data entry procedures comprising steps 82 to 85 are repeated until the number of connection requests entered is equal to the number of connection requests declared at the start of the connection request data entry procedure.

In step 77, the bitrate capacity of the network link (capacity in CtDiscreteResource object) is set to a default maximum value. Data describing the actual network link bitrate capacity available in practice and a network link identifier can be entered into the knowledge base (step 78). Again, data entry may be done manually by an operator or downloaded from a management information base. In the present embodiment of the connection scheduling process only data describing the network links is required to be entered into the knowledge base. This data may be obtained from the management information base 27. It will be apparent to those skilled in the art that the connections scheduler can be expanded to include other network resource constraints such as maximum node capacity.

Figure 9:
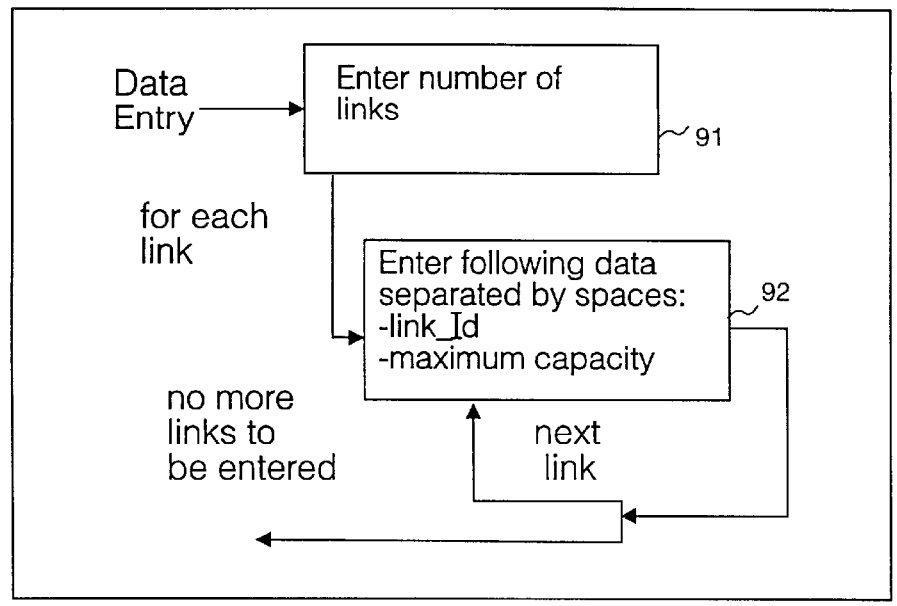
FIG. 9 illustrates a data entry procedure for entering details of network links into the connections scheduler.

The data entry procedure follows an order of data entry. Referring to FIG. 9 of the accompanying diagrams herein, firstly a number of links to be entered is input in step 91. For each network link, a link identifier (name) followed by a space and a numerical value representing the maximum bitrate capacity of the network link is entered (capacity in CtDiscreteResource object) step 92. This is repeated until the number of links entered is equal to the number of links declared at the start of the data entry procedure.

Step 79 in FIG. 7 is optional and is used for entering bitrate capacities which vary over time for network links. This can be useful if it is known that demand on particular network links is low or high at certain times of the day. This may be done manually by an operator or downloaded from a previously created schedule of the knowledge base. The data entry procedure follows a predetermined order and data typing as illustrated in FIG. 10 herein.

Figure 10:
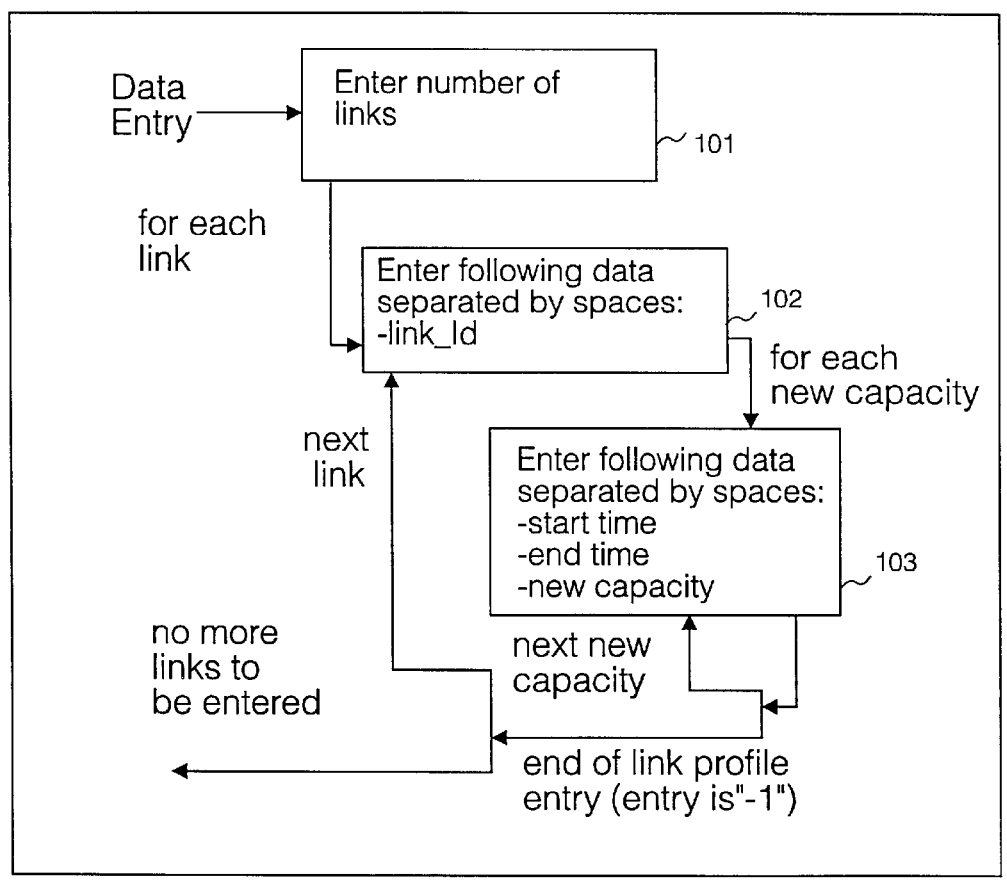
FIG. 10 illustrates a data entry procedure for varying bitrate capacities of network links over time.

Referring to FIG. 10 herein, data describing the number of links whose bitrate capacities are to be modified is entered—step 101. For each link an appropriate link identifier (name) is entered—step 102. For each new bitrate capacity for the link data describing a time from which the new capacity is valid followed by a space and then a time at which the new capacity is no longer valid, followed by a numerical value representing the new bitrate capacity—step 103 times and new capacity value for the link are entered until "−1" is inputted for one of the values.

Connections Scheduling Process Inference Engine Strategy

Figure 11:
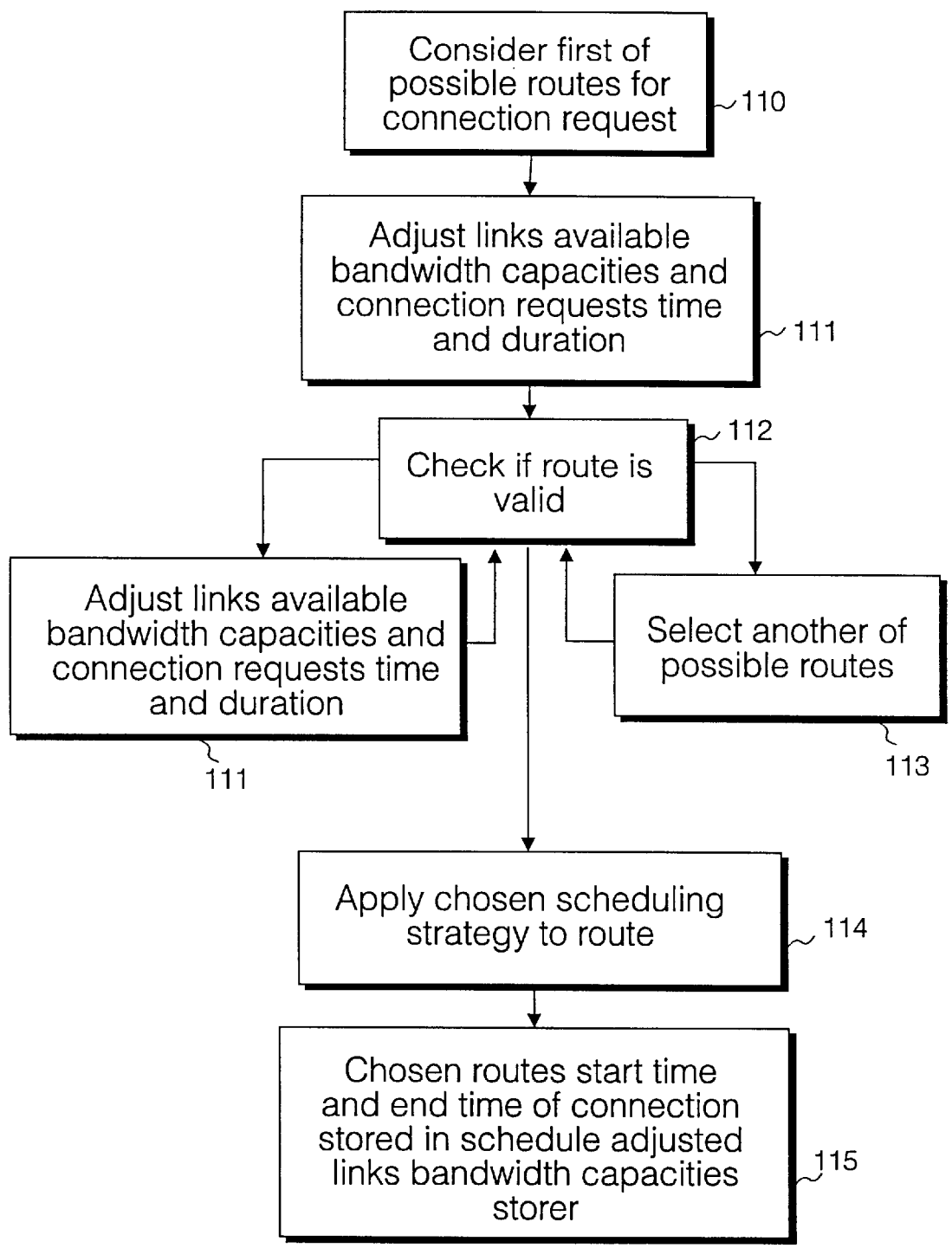
FIG. 11 illustrates steps taken by an inference engine of the connections scheduler to select a valid route of links for each connection request in the knowledge base.

Referring to FIG. 11 of the accompanying drawings herein, there is illustrated a schematic diagram showing the steps taken by inference engine 43 to select a valid route of links for each connection request in the knowledge base 41. A valid route is one in which the connection begins within the connection request's StartMin and StartMax time range and terminates within the connection request's EndMin and EndMax range (thereby adhering to the connection request DurMin and DurMax range). In a valid route, each network link in the route has sufficient bitrate capacity to fulfill the connection request's bitrate capacity requirements throughout the duration of the connection.

In the specific embodiment of the connections scheduler presented herein, the first route entered for each connection request is considered first by the inference engine—step 110. This first route is given by routeId in the first element of the routes array of a connection request.

In step 111 if each link in the route has sufficient bitrate capacity to fulfill the connection request bitrate capacity requirements, the bitrate capacity of each link is adjusted accordingly, ie capacity (requirement) value in the connection request Connection object is subtracted from capacity value in the CtDiscreteResource object of each link in the route. However, if a particular network link's bitrate capacity is lower than the bitrate capacity required by the connection request and the connection request's start and end time ranges enables its duration to vary to a time range when the required bitrate capacity is available, the start and end time of the connection will be adjusted accordingly. An example may be:

Network link A with bitrate capacity 500 Mb/s
Network link B with bitrate capacity 500 Mb/s
Connection X requires bitrate capacity of 400 Mb/s on links A and B with domain: CtIntervalActivity [0--50..300-->50..350]
Connection X requires bitrate capacity 300 Mb/s on link A with domain: CtIntervalActivity [0..100--100..300-->100..350]
Then Connection X will be constrained to the domain:
CtIntervalActivity [0--50..300-->50..350]
Connection Y will be constrained to the domain:
CtIntervalActivity [50..100--100..300-->150..350}

If the connection request's first route is not a valid route (this is checked in step 112) the inference engine algorithm selects another route comprising different network links from the connection requests routes array (step 113) and steps 111 and 112 are repeated. For example:

A network link A with bitrate capacity 500 Mb/s
A network link B with bitrate capacity 500 Mb/s
Connection X requires bitrate capacity 400 Mb/s on links A and B with domain: Connection X: CtIntervalActivity [0..50--50..300-->50..350}
Connection Y: CtIntervalActivity [0..100--100..300-->100..350]

On scheduling connection X first connection Y will be altered:
Connection X: CtIntervalActivity [0--50-->50]
Connection Y: CtIntervalActivity [50..100--100..300-->150..350]
Connection Y would then be scheduled: Connection X: CtIntervalActivity [0--50-->50]
Connection Y: CtIntervalActivity [50--100-->150]

If the order of scheduling was reversed then connection Y would be scheduled as:
Connection Y: CtIntervalActivity [0--100-->100]

As connection X requires bitrate capacity such that the total capacity at a start time before 50 would exceed that allowed, and connection X is constrained to a start time before 50, this connection would fail to be scheduled.

Once a route has been chosen for a connection request, _chosenRoute in the connection request's Connection object is set to the routeId of the route. The schedule variable of the connection request is set to "false" and its scheduled variable is set to "true". Scheduled connection requests are referred to as "connections". Data describing the actual scheduled start time is stored in the connection's chosen-StartTime variable. Data describing the actual scheduled end time of the connection is stored in its chosenEndTime variable. Once a route has been chosen for a connection, the adjusted bitrate capacities of the links in the chosen route will be stored in the knowledge base so that each subsequent connection request will have to conform to these new bitrate capacity constraints.

In the present specific embodiment of the invention, if no valid route is found for a connection request the connection request will be left unscheduled.

The present specific method applies a variety of routing strategies—indicated by step 114 in FIG. 11. Using a particular strategy may also result in more connections being scheduled depending upon the communication network and connection request values. For example, a default scheduling strategy attempts to set each connection request's start and duration domains to the lowest possible values. A variation on this scheduling strategy included in the present invention is to attempt to set each connection request's start and duration domains to the highest possible value. Other scheduling strategies included in the present invention are:

"Schedule most constrained": Connection requests with smallest domains (most constrained ranges) have their domains set to lowest possible values first.

"Schedule minimum choice": Lowest value of the minimum values of each domain are set first.

"Schedule maximum choice": Lowest value of the maximum values of each domain are set first.

"Schedule most constraints": Variable which has most constrained domain is set to its lowest possible value first.

By applying a suitable scheduling strategy, it is possible to optimize the searching based on specified search criteria. One example of an optimization is that a link should be fully fitted with connection requests before moving on to a next link. A second example of an optimization is to balance a loading across a plurality of links of the network. By applying the scheduling strategies, there may be achieved a flexibility to optimize the search against specified criteria. If a scheduling strategy is not applied, then it may not be possible to optimize a schedule as well as if an above scheduling strategy were applied, and secondly a solution for all connection requests may not be found, only a partial solution for some connection requests. Thirdly, the scheduling could take an unacceptably high amount of computer processing time, so that the scheduling is not achieved for a period of days to weeks.

An advantage of the approach adopted in the best mode herein, may be that the scheduling process may be adapted for scheduling connections for a plurality of different transport or traffic types by variation of the constraint data which is input.

In an implementation of the process as configured for communications networks operating the ATM transport types, constraint data is written specific to ATM. For example, one of the constraints may be allocation of bursty traffic data to routes, in accordance with a known algorithm which determines a required bitrate capacity on a connection for carrying traffic data of a specified "burstiness", for example, although the traffic data may have a peak bitrate of X MBits/s, the allocated bitrate capacity on a link according to the algorithm may only be Y MBits/s, where Y is less than X according to a known formula of burstiness divided by mean bitrate. In general, the constraint data is written in to the connections scheduler at compilation time, the constraints being selected according to knowledge of the particular traffic type and transport mechanism for which reserved connections are to be scheduled.

Connection Scheduling Process User Interface

FIGS. 12 to 19 herein illustrate an overview of features available at of the graphical user interface 28 by which an operator of the connections scheduler can obtain visual data and views of scheduled connections across a communications network in the form of interactive window displays on a visual display monitor of the graphical user interface of the network controller. Details of how these displays are generated will not be described as all displays are programmed using conventional techniques known to those skilled in the art to display data generated by the connections scheduler and data present on the management information base. The intent is to illustrate how the specific embodiment connections scheduler may be used in practice.

Figure 12:
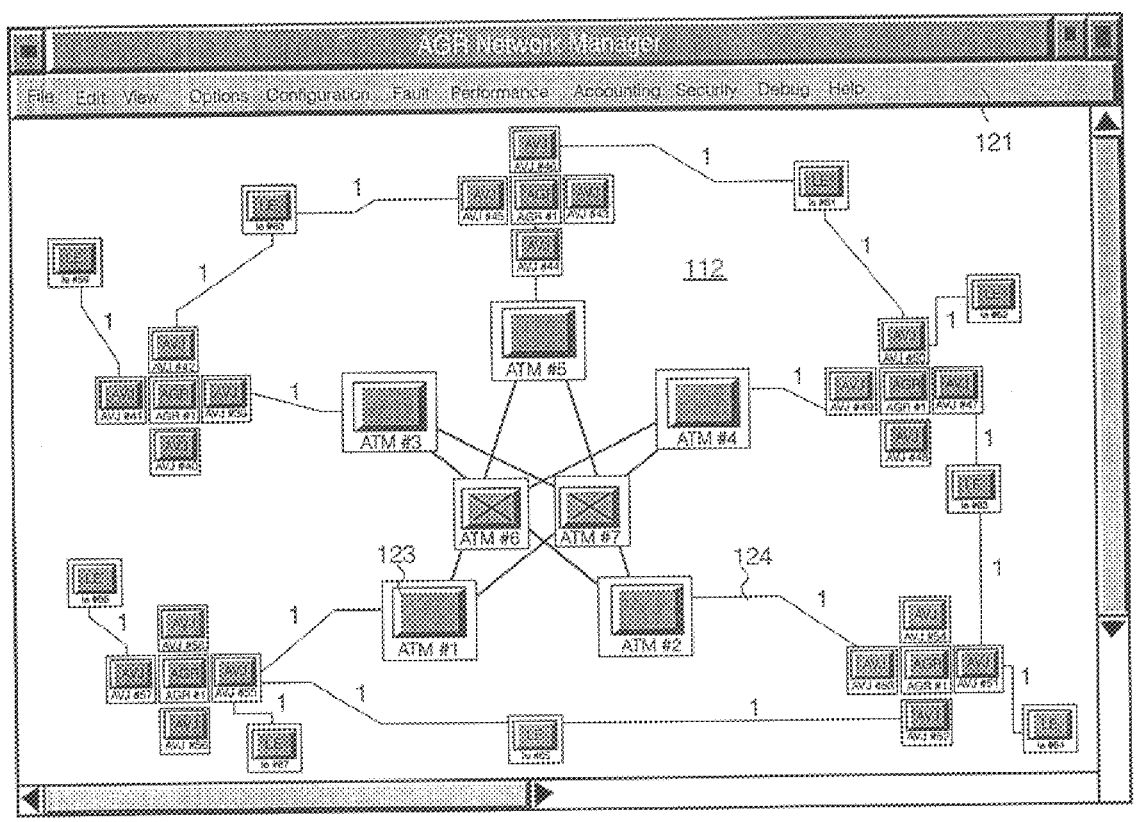
FIG. 12 illustrates a diagrammatic representation of a graphical interface display comprising an "on-screen" network view window.

FIG. 12 illustrates a diagrammatic representation of an on-screen network view presented as a display at graphical user interface 28 of the network controller. The network view comprises a window from which sub-window and dialog displays can be invoked. The network view consists of a menu bar 121 and a graphical representation of the communications network 122. Network elements such as nodes and other pieces of equipment are represented by icons 123 and the links between nodes represented as lines 124. It is possible to select any of the links and bring up corresponding menu and dialog box displays to set attributes of the selected links from the network view. The network link data entry procedure described in the schedule knowledge base section above may be invoked by using the network view at the graphical user interface.

Figure 13:
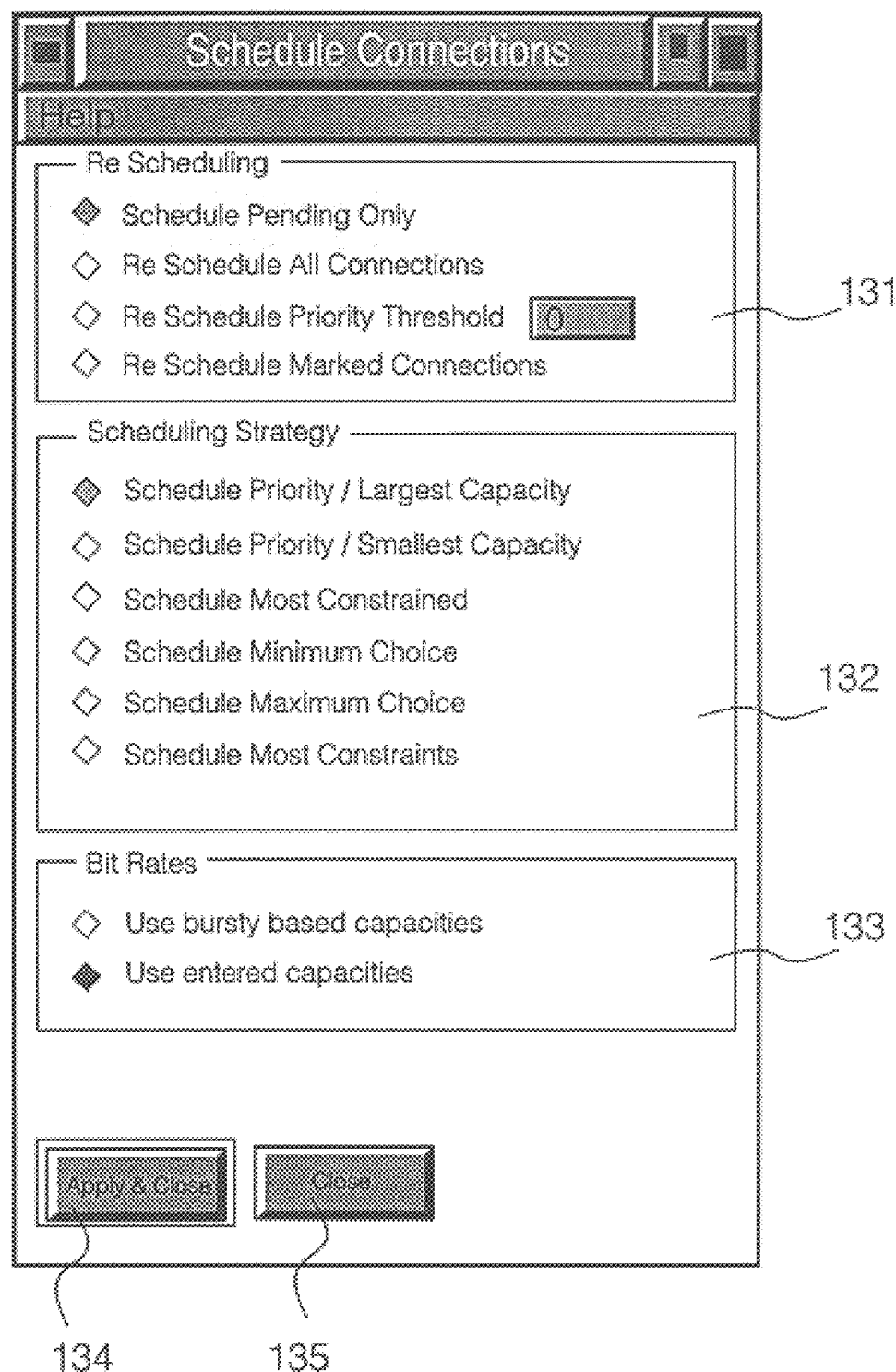
FIG. 13 illustrates an example of a display produced by a graphical interface which may be used to set the operational and scheduling criteria for a connection scheduling process.

FIG. 13 illustrates a dialog box display which can be used by an operator to control the connection scheduling process at the graphical user interface 28 of the network controller. To select functions the operator selects one or more diamond shaped icons using a pointing device in function groups displays 131, 132 or 133 and then selects"Apply and Close" button 134 to apply the scheduling function selected or close button 135 to cancel the connection scheduling process. Functions in group 131 are used to invoke the connection scheduling process in various ways: "Schedule Pending Only" will schedule reservations for all connection requests which have not yet been scheduled (initially all connection requests will be unscheduled) "Reschedule All Connections" will apply the connection scheduling process to all connection requests in the knowledge base. The functions in group 132 will select which of the six scheduling strategies (described in Connection Scheduling Process Inference Engine Operation above) will be used in the connection scheduling process. Function group display 133 allows selection of one of two different algorithms for calculation of capacity usage.

Figure 14:
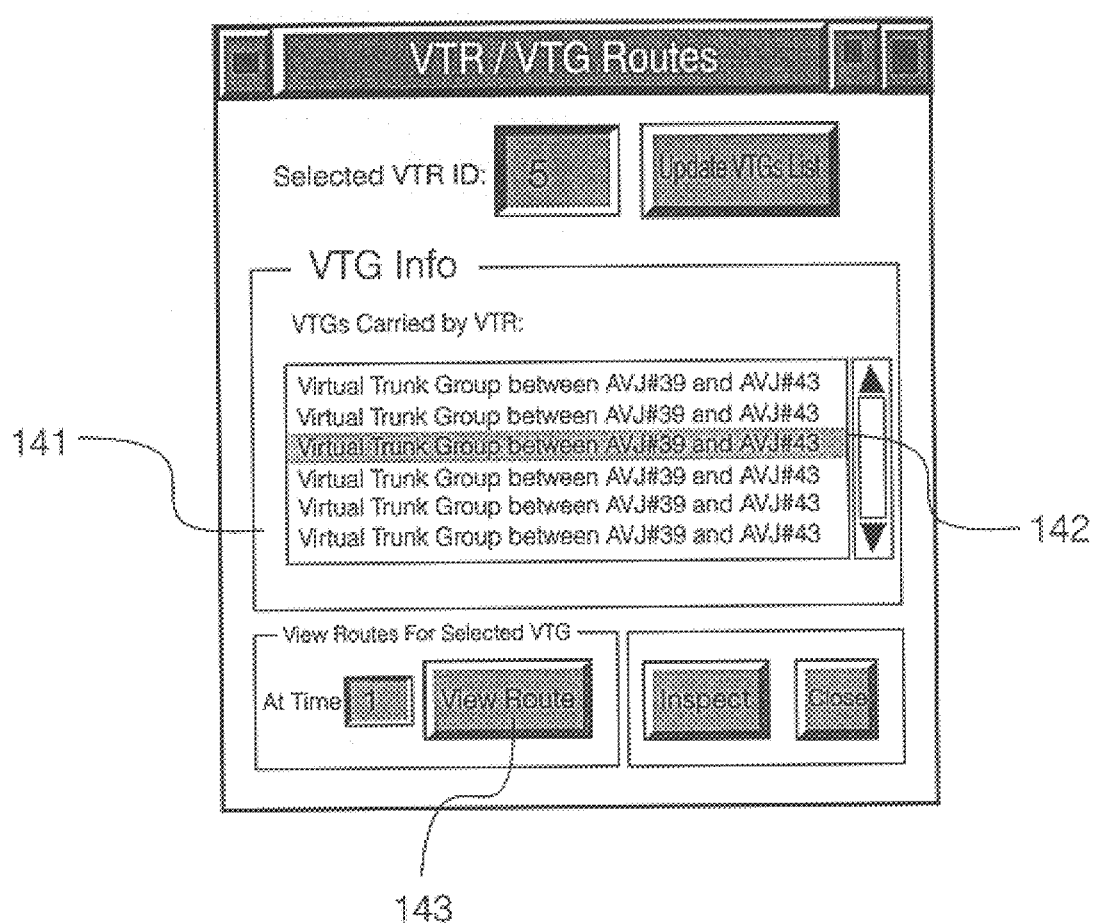
FIG. 14 illustrates an example of a graphical interface display used to show a chosen route for a connection.

FIG. 14 illustrates a dialog box display which can be used to show a chosen route for a connection. A list of connections is given in a scroll box 141. The operator can select one of the connections in the scroll box which then becomes highlighted 142. Selecting a "Route" button 143 will display the chosen route for the highlighted connection in the network view window.

Figure 15:
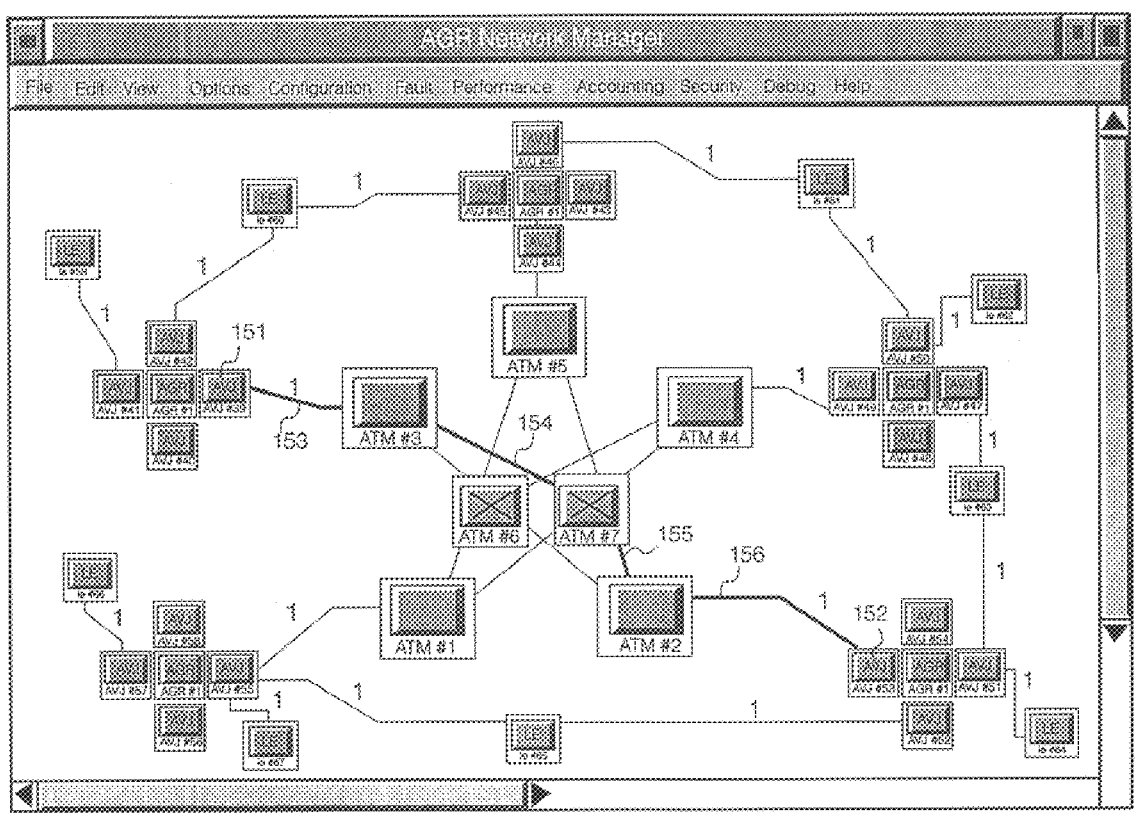
FIG. 15 illustrates a graphical interface display comprising a network view display with a route of a connection highlighted.

FIG. 15 illustrates a network view with the route corresponding to a connection selected using the dialog box display in FIG. 14 highlighted. The network links 153–156 in the chosen route between source node 151 and destination node 152 are highlighted in the network view display.

Figure 16:
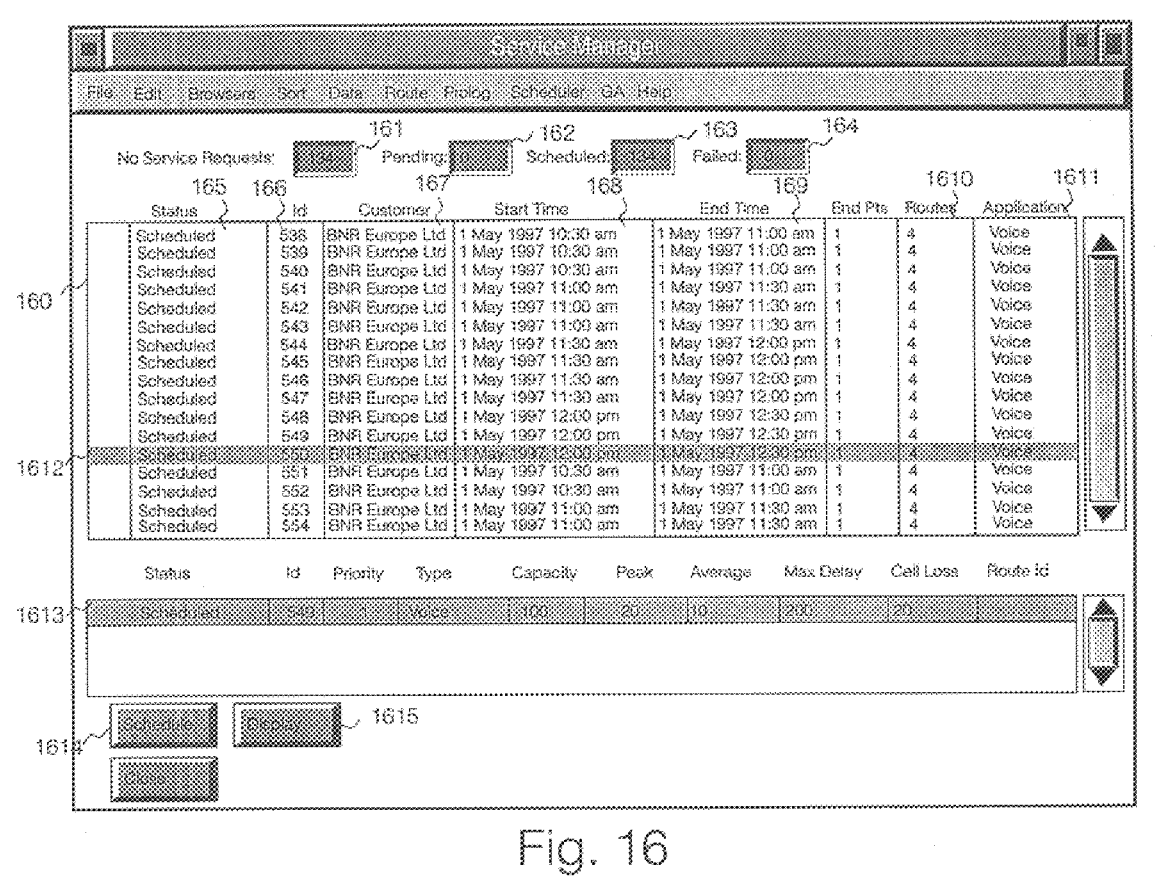

FIG. 16 illustrates a service manager window display at graphical user interface 28, displaying a list of scheduled connections and unscheduled and connection requests. The total number of scheduled connections and unscheduled connection requests is displayed 161 along with amount of unscheduled connection requests 162 and scheduled connections 163. The number of connection requests which have failed to be scheduled is also shown 164. Each connection/connection request is displayed in a scroll box 160. For each connection/connection request displayed the following information can be viewed:

Status 165 (whether a connection is scheduled or if scheduling is pending);
A numerical identifier 166 (given by conId variable);
Information about customer who made the connection request 167;
The start time 168 and end time 169 of the connection/connection request;
The number of possible routes of the connection/connection request 1610; and
Information about the type of application to which the connection/connection request relates 1611.

A connection/connection request in the list may be selected by the operator, which is then shown highlighted 1612. For the selected connection/connection request it is possible to display its chosen route in the network view window by selecting a "Display" icon 1615. Selecting "Schedule" icon 1614 will bring up the dialogue box illustrated in FIG. 13 as described above.

Figure 17:
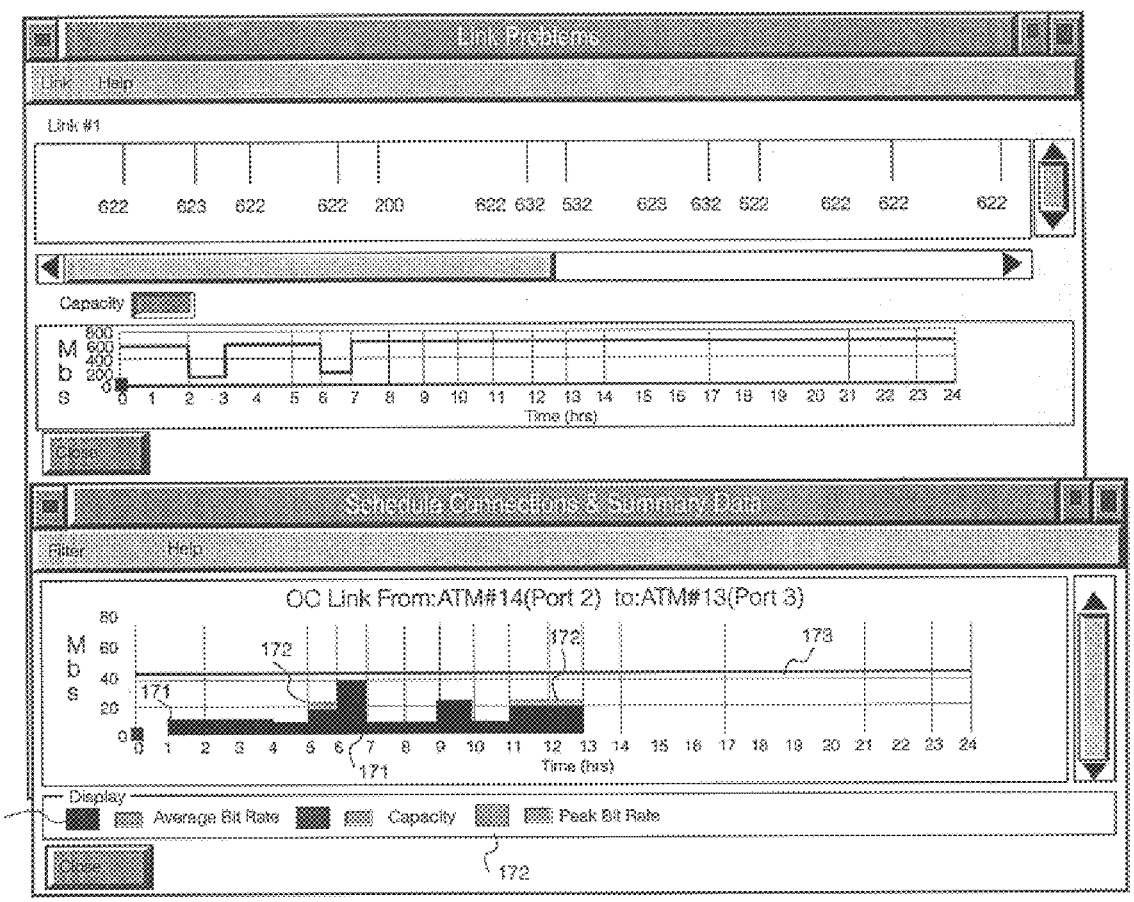
FIG. 17 illustrates a graphical interface display showing two interfaces: an upper interface displaying bitrate capacities of a plurality of network links and allowing a user to graphically change a set of parameters; and a lower display showing bitrate capacity of a selected link and its mean bitrate capacity in use over a time horizon; and their usage over a period of time.
Figure 18:
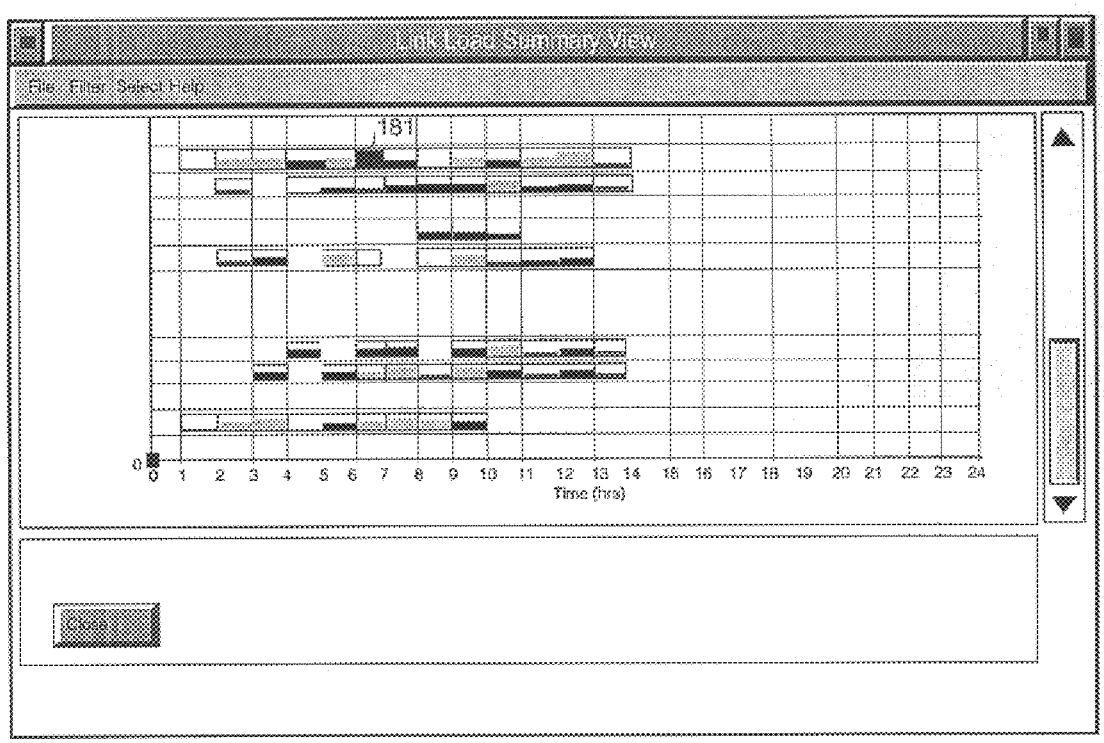
FIG. 18 illustrates a graphical interface display showing bitrate capacities of a plurality of network links and their loading over a period of time.

FIGS. 17 and 18 show displays produced by the connections scheduler of a network links' bitrate capacity and usage over a period of time for a plurality of scheduled connections.

In FIG. 17, there is illustrated two different displays overlaid on each other on a single display screen. The operator may switch from display to display using a pointing device, eg a mouse or trackball device at the graphical user interface 28. Illustrated in the lower section of FIG. 17 is a schedule connections summary data window which shows a display of average bitrate 171 and peak bitrate 172 over a period 00.00 hours to 13.00 hours between a second port of a first ATM switch (ATM#14 (port 2)) and a third port of a second ATM switch (ATM#13 (port 3)). The schedule connections summary data display also illustrates a maximum bitrate capacity 173 of the link. A network operator may visually determine from the schedule connection summary data display the bitrate utilization of a link over a period of time, and easily determine by inspection any periods when the average or peak bitrate approaches the maximum available capacity 173 allocated to the connection.

A link problems display, partially shown in an upper part of FIG. 17 shows traffic over a selected link. The operator may alter the maximum capacity constraint for various periods of time by selecting the time period, and entering the revised capacity. An operator can compare a link with a connection visually by selecting two different displays on the same monitor as shown in FIG. 17.

In FIG. 18 herein, a display of a link load summary view is shown. Utilization of each of a plurality of links over time is shown, the utilizations being displayed next to each other, for easy comparison. For each link there is displayed a bar chart of percentage of maximum link capacity against time. Different levels of utilization are color coded, and where utilization is approaching its maximum, for example between hours 6.00 and 7.00, 181 the display may adopt a distinct color, eg red or black, visually highlighting to the network operator that during that period the link is approaching its maximum utilization and there is a danger of overloading the link. By comparing a plurality of links on a single view at the network controller, a network operator may gain an overall view of network loading. This provides the operator with useful information for managing the connections over various links in such a way as to average out the overall traffic loading on the network due to the scheduled connections, avoiding any periods where particular links become overloaded, and balancing out the requested connections over a plurality of different links and spread out over time.

Figure 19:
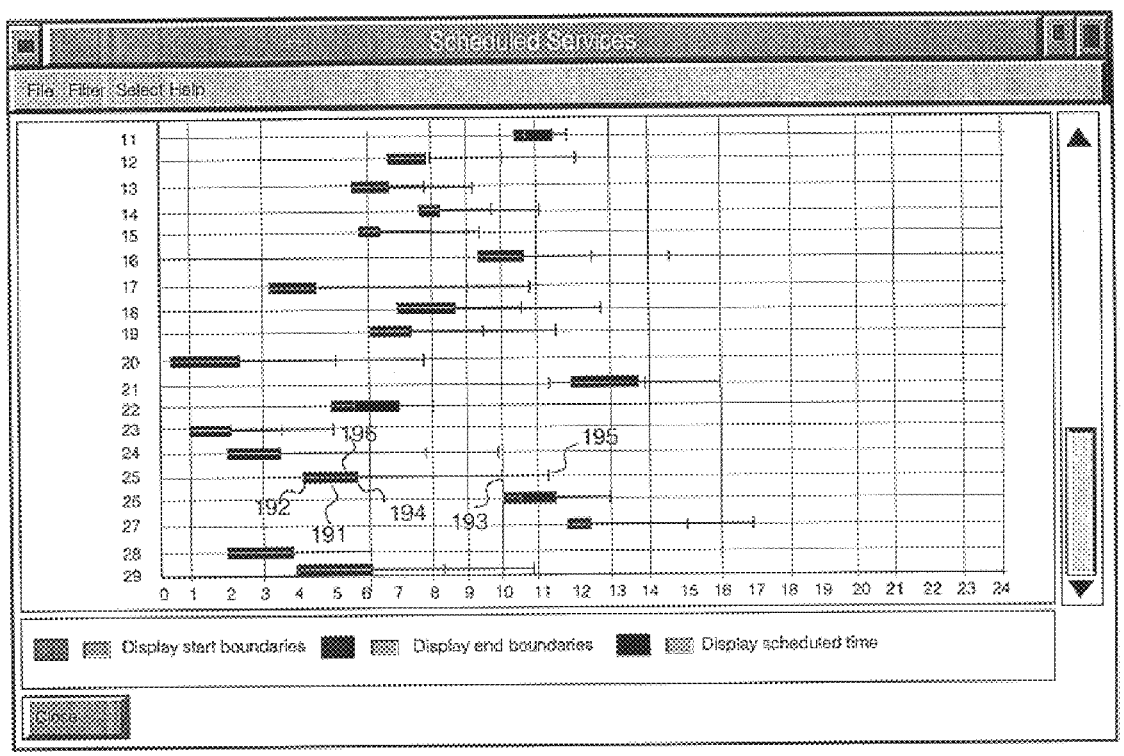
FIG. 19 illustrates a Gant chart display produced at a graphical interface, displaying data describing connections scheduled by the connections scheduler.

FIG. 19 herein illustrates a Gant chart display produced at the graphical user interface, displaying data generated by the connections scheduler which shows start and end time domains of each of a plurality of connection requests and the actual connection time period scheduled for these connections. A vertical axis of the chart represents a list of connection requests and a horizontal axis of the chart represents a 24 hour day, divided into one hour intervals. A start time domain for a connection request is represented by a horizontal line 191 which has a vertical bar 192 at its leftmost end representing the StartMin value and a vertical bar 193 at its rightmost end representing the StartMax value of the connection request. An end time domain of a connection is represented over a horizontal line (of different color to the start time domain line on the actual screen display) 194 which has a vertical bar at its leftmost end representing the EndMin and a vertical bar 195 at its rightmost end representing the EndMax value. The duration of the connection as scheduled is represented by a thick black horizontal line 196 with its leftmost end representing the actual connection start time and its rightmost end representing the actual connection end time.

The Gant chart display as illustrated in FIG. 19 enables a human operator of a network controller apparatus to obtain a visual summary of timing of scheduled connections across a network in easily understandable format. Using a display as illustrated with reference to FIG. 19, the network operator may be able to give fast and accurate advice to a subscriber who has requested a connection, confirming the details of start time, end time and duration of the subscriber's scheduled connection. This also gives the operator/developer insight into how the connections have been scheduled within time constraints, as a result of the algorithms and constraints in operation.

A network operator at graphical user interface 28 can switch between different display types as illustrated in FIGS. 12 to 19 herein, moving from display to display interactively using the pointing device of the graphical user interface.

In the best mode herein, reservations for connections are made by searching a search space comprising a large number of possible routes across the network, the search operating in accordance with constraint based techniques, and utilizing a knowledge based system. However, in an alternative second specific implementation of the present invention, the knowledge base 41 and inference engine 42 may be replaced by a relatively less sophisticated reservation algorithm which reserves connections in response to connection requests without necessarily optimizing network resources and without taking into account selected constraints, eg variable start times ranges. The reservation algorithm may operate to reserve connections in accordance with connection requests which specify a predetermined start time, and a predetermined duration time of the requested connection.

A 'C' language based application may select a route from a routing table stored in the management information base, and attempt to allocate a particular connection request to the route, eg using conventional connection admission control algorithms. The reservations algorithm may operate to maintain a record of reserved capacity for each route, in order to avoid overloading a route at a future time, and to avoid allocation of the route to a plurality of connections which specify an aggregate bitrate for all connections over that route which is in excess of the bitrate capacity of the route. If a route is available which has adequate capacity to fulfill a requested connection, the reservation algorithm reserves that route for a connection request. If a route is unavailable, the reservation algorithm may return a response indicating that the connection cannot be reserved. The reservation algorithm may attempt to pick a second route where reservation of a connection request fails, or may return a message that a requested connection cannot be reserved in cases of inadequate capacity on a route. Selection of routes may be made according to a predetermined conventional routing algorithm found in a conventional switch. The conventional routing algorithm sequentially inspects a plurality of routes between a source node and destination node specified in a connection request, and upon first finding a route which has sufficient capacity to satisfy the connection request, returns data describing that route to the reservations algorithm. In the second implementation, no optimization of search strategy of routes is carried out, but rather the reservation algorithm receives from the route finding algorithm the first found route which is capable of satisfying the connection request. The conventional route finding algorithm may differ from switch to switch. For example, some conventional switches operate a shortest path routing algorithm for finding routes.

In the second specific implementation, operating without the use of constraints, the connection request may specify a start time for the requested connection, rather than a range of acceptable start times as in the best mode herein. In the second specific implementation, the graphical interface displays as illustrated with reference to FIGS. 12–19 herein may be simplified by removal of icons and display items specific to the constraints based implementation of the best mode herein.

In particular, a schedule connections display of FIG. 13 may be modified by removal of the scheduling strategy options shown in FIG. 13. The service manager display of FIG. 16 may be simplified by omission of the priority information. Other information included in the service manager display, for example the type of data eg voice may be provided for information only, but is not used in operation the reservation algorithm of the second implementation. The link problems display and schedule connections and summary data displays of FIG. 17, being constraint specific are absent from the second implementation. A link load summary view display as illustrated in FIG. 18 may be present for information only. In the second implementation, the scheduled services display illustrated in FIG. 19 may be simplified by omission of the range icons 192, 194, since in the second implementation ranges of preferred start times are not necessarily used by the scheduling algorithm.

REFERENCES

[1] Constraint satisfaction in logic programming by Pascal Van Hentenryck published by Massachusetts Institute of Technology Press, Cambridge Mass. 02142, ISBN 0-262-08181-4

What is claimed is:

1. A process for reserving a plurality of connections in a communications network, said process comprising machine executable steps of:

inputting a plurality of connection requests describing a plurality of required connections, each of said connection requests specifying a predetermined start time for said connection, wherein at least one of said connection requests specifies a range of values for the predetermined start time of said connection; and reserving a plurality of connections across said communications network in response to said plurality of connection requests, wherein said step of reserving connections comprises, for each of said required connections, searching for an available route and, where an available route is found, reserving said route in advance of said predetermined time, and wherein at least one of the plurality of said connection requests specifies a required bitrate and said step of searching further comprises searching for one or more routes having an available capacity capable of supporting said required bitrate.

2. A process for reserving a plurality of connections in a communications network, said process comprising machine executable steps of:

inputting a plurality of connection requests describing a plurality of required connections, each of said connection requests specifying a predetermined start time for said connection, wherein at least one of said connection requests specifies a range of values for the predetermined start time of said connection;

reserving a plurality of connections across said communications network in response to said plurality of connection requests; and generating a display view of a said reserved connection, said view comprising a bar chart display displaying data representing a plurality of links on a first axis, and displaying data representing time on a second axis, wherein said data representing a plurality of said links comprises data representing utilization of said links.

3. A network management apparatus for managing a communications network comprising a plurality of node elements and a plurality of link elements, wherein data communication services are carried over a plurality of end to end connections over said nodes and links, said apparatus comprising:

interface means for inputting a plurality of requests for connections across said network;

means for reserving a plurality of connections across said communications network in response to said plurality of connection requests, wherein said interface means comprises means for specifying a range of values for a predetermined start time for one of said plurality of connection; and display means supporting a plurality of display views, wherein at least one of the plurality of said views comprises a list of reserved connections and, for each reserved connection in said list, a display of start time of the reserved connection.

4. A network management apparatus for managing a communications network comprising a plurality of node elements and a plurality of link elements, wherein data communication services are carried over a plurality of end to end connections over said nodes and links, said apparatus comprising:

interface means for inputting a plurality of requests for connections across said network;

means for reserving a plurality of connections across said communications network in response to said plurality of connection requests, wherein said interface means comprises means for specifying a range of values for a predetermined start time for one of said plurality of connections; and display means supporting a plurality of display views, wherein at least one of the plurality of said display views comprises a bar chart display displaying data representing a plurality of links on a first axis, and displaying data representing time on a second axis, wherein said data representing the plurality of said links comprises data representing utilization of said links.

5. A network management apparatus for managing a communications network comprising a plurality of node elements and a plurality of link elements, wherein data communication services are carried over a plurality of end to end connections over said nodes and links, said apparatus comprising:

interface means for inputting a plurality of requests for connections across said network;

means for reserving a plurality of connections across said communications network in response to said plurality of connection requests, wherein said interface means comprises means for specifying a range of values for a predetermined start time for one of said plurality of connections; and display means supporting a plurality of display views, wherein at least one of the plurality of said display views comprises a display of data describing a plurality of services arranged along a first axis, and data describing time on a second axis, wherein said display of said data describing said services comprises a plurality of icons representing available time slots specified in a plurality of connection requests and a plurality of icons representing time durations of reserved connections.

6. The process as claimed in claim 2, comprising the step of, for each required connection, allocating capacity of a corresponding reserved route to said connection.

7. The process as claimed in claim 2, wherein said predetermined time comprises a start time.

8. The process as claimed in claim 2, comprising the step of searching for a valid route for each requested connection from a list of all possible routes across said network.

9. The process as claimed in claim 2, comprising the step of constraining a search of all possible routes within operator defined constraint parameters.

10. The process as claimed in claim 2, wherein at least one of the plurality of said connection requests specifies a source node and a destination node comprising the step of searching for an available route by creating a list of a plurality of routes between a plurality of corresponding respective source nodes and destination nodes of said plurality of requested connections.

11. The process as claimed in claim 2, wherein said connection requests are stored as a list of connection requests awaiting available routes.

12. The process as claimed in claim 2, further comprising the step of storing a list of connection requests for which routes have been reserved.

13. The process as claimed in claim 2, further comprising the step of displaying a list of connection requests which are awaiting available routes.

14. The process as claimed in claim 2, further comprising the step of displaying a list of connection requests for which routes have been reserved.

15. The process as claimed in claim 2, comprising the step of displaying a plurality of display views of said reserved connections.

16. The process as claimed in claim 2, comprising the step of generating a network view showing node elements and link elements as a plurality of corresponding icons; and visually displaying a route taken by a reserved connection on said network view.

17. The process as claimed in claim 2, further comprising the step of displaying a list of reserved connections, and for each said displayed reserved connection, displaying a start time of the reserved connection.

18. The process as claimed in claim 2, comprising the step of displaying data describing parameters of a reserved connection, wherein said parameters are selected from the set:

a traffic type;

a link data capacity;

a route data capacity;

a peak bitrate;

an average bitrate;

an estimated cell loss;

a priority rating of a said connection.

19. The process as claimed in claim 2, further comprising the step of generating a display view displaying data describing a plurality of services carried on said reserved connections.

20. The network management apparatus as claimed in claim 5, further comprising display means supporting a plurality of display views, wherein at least one of the plurality of said views comprises:

a list of reserved connections, and for each reserved connection in said list:

a display of start time of the reserved connection.

21. The network management apparatus as claimed in claim 4, comprising display means for displaying a plurality of display views of reserved connections, wherein for each said displayed reserved connections there is displayed data describing parameters of the each of said displayed reserved connections wherein said parameters are selected from a set:

a traffic type;

a link data capacity;

a route data capacity;

a peak bitrate;

an average bitrate;

an estimated cell loss;

a priority rating.

22. The network management apparatus as claimed in claim 5, comprising display means for displaying a plurality of display views of reserved connections, wherein for each said displayed reserved connections there is displayed data describing parameters of the each of said displayed reserved connections wherein said parameters are selected from a set:

a traffic type;

a link data capacity;

a route data capacity;

a peak bitrate;

an average bitrate;

an estimated cell loss;

a priority rating.

23. The network management apparatus as claimed in claim 5, comprising display means supporting a plurality of display views, wherein at least one of the plurality of said display views comprises:

a bar chart display displaying data representing a plurality of links on a first axis, and displaying data representing time on a second axis;

wherein said data representing the plurality of said links comprises data representing utilization of said links.

24. The network management apparatus as claimed in claim 4, comprising display means supporting a display view, wherein data describing utilization is color coded according to an amount of said utilization.

25. The network management apparatus as claimed in claim 5, comprising display means supporting a display view, wherein data describing utilization is color coded according to an amount of said utilization.

26. The network management apparatus as claimed in claim 5, comprising display means supporting a plurality of display views, wherein at least one of the plurality of said display views comprises:

a display of data describing a plurality of services arranged along a first axis, and data describing time on a second axis;

wherein said display of said data describing said services comprises a plurality of icons representing available time slots specified in a plurality of connection requests; and a plurality of icons representing time durations of reserved connections.

27. A network management apparatus as claimed in claim 4, comprising display means supporting a plurality of display views, in which an available time slot icon comprises:

an icon representing a start time; and an icon representing an end time.

28. A network management apparatus as claimed in claim 5, comprising display means supporting a plurality of display views, in which an available time slot icon comprises:

an icon representing a start time; and an icon representing an end time.

29. The reservation process as claimed in claim 2, wherein said step of reserving connections comprises, for each of said required connections;

searching for an available route; and where an available route is found, reserving said route in advance of said predetermined time.

30. The process as claimed as claimed in claim 29, wherein at least one of the plurality of said connection requests specifies a required bitrate and said step of searching comprises searching for one or more routes having an available capacity capable of supporting said required bitrate.

31. The process as claimed in claim 1, comprising the step of, for each required connection, allocating capacity of a corresponding reserved route to said connection.

32. The process as claimed in claim 1, wherein said predetermined time comprises a start time.

33. The process as claimed in claim 1, comprising the step of searching for a valid route for each requested connection from a list of all possible routes across said network.

34. The process as claimed in claim 1, comprising the step of constraining a search of all possible routes within operator defined constraint parameters.

35. The process as claimed in claim 1, wherein at least one of the plurality of said connection requests specifies a source node and a destination node comprising the step of searching for an available route by creating a list of a plurality of routes between a plurality of corresponding respective source nodes and destination nodes of said plurality of requested connections.

36. The process as claimed in claim 1, wherein said connection requests are stored as a list of connection requests awaiting available routes.

37. The process as claimed in claim 1, further comprising the step of storing a list of connection requests for which routes have been reserved.

38. The process as claimed in claim 1, further comprising the step of displaying a list of connection requests which are awaiting available routes.

39. The process as claimed in claim 1, further comprising the step of displaying a list of connection requests for which routes have been reserved.

40. The process as claimed in claim 1, comprising the step of displaying a plurality of display views of said reserved connections.

41. The process as claimed in claim 1, comprising the step of generating a network view showing node elements and link elements as a plurality of corresponding icons; and visually displaying a route taken by a reserved connection on said network view.

42. The process as claimed in claim 1, further comprising the step of displaying a list of reserved connections, and for each said displayed reserved connection, displaying a start time of the reserved connection.

43. The process as claimed in claim 1, comprising the step of displaying data describing parameters of a reserved connection, wherein said parameters are selected from the set:
- a traffic type;
- a link data capacity;
- a route data capacity;
- a peak bitrate;
- an average bitrate;
- an estimated cell loss;
- a priority rating of a said connection.

44. The process as claimed in claim 1, further comprising the step of generating a display view of a said reserved connection, said view comprising:
- a bar chart display displaying data representing a plurality of links on a first axis, and displaying data representing time on a second axis;
- wherein said data representing a plurality of said links comprises data representing utilization of said links.

45. The process as claimed in claim 1, further comprising the step of generating a display view displaying data describing a plurality of services carried on said reserved connections.

46. The network management apparatus as claimed in claim 4, further comprising display means supporting a plurality of display views, wherein at least one of the plurality of said views comprises:
- a list of reserved connections, and for each reserved connection in said list:
  - a display of start time of the reserved connection.

47. The network management apparatus as claimed in claim 3, comprising display means for displaying a plurality of display views of reserved connections, wherein for each said displayed reserved connections there is displayed data describing parameters of the each of said displayed reserved connections wherein said parameters are selected from a set:
- a traffic type;
- a link data capacity;
- a route data capacity;
- a peak bitrate;
- an average bitrate;
- an estimated cell loss;
- a priority rating.

48. The network management apparatus as claimed in claim 3, comprising display means supporting a plurality of display views, wherein at least one of the plurality of said display views comprises:
- a bar chart display displaying data representing a plurality of links on a first axis, and displaying data representing time on a second axis;
- wherein said data representing the plurality of said links comprises data representing utilization of said links.

49. The network management apparatus as claimed in claim 3, comprising display means supporting a display view, wherein data describing utilization is color coded according to an amount of said utilization.

50. The network management apparatus as claimed in claim 3, comprising display means supporting a plurality of display views, wherein at least one of the plurality of said display views comprises:
- a display of data describing a plurality of services arranged along a first axis, and data describing time on a second axis;
- wherein said display of said data describing said services comprises a plurality of icons representing available time slots specified in a plurality of connection requests; and
- a plurality of icons representing time durations of reserved connections.

51. A network management apparatus as claimed in claim 3, comprising display means supporting a plurality of display views, in which an available time slot icon comprises:
- an icon representing a start time; and
- an icon representing an end time.

* * * * *